(12) United States Patent
Moriguchi et al.

(10) Patent No.: US 9,313,948 B2
(45) Date of Patent: Apr. 19, 2016

(54) ELECTRIC WORK MACHINE

(75) Inventors: Kazuma Moriguchi, Osaka (JP); Tomoyuki Ebihara, Osaka (JP)

(73) Assignee: YANMAR CO., LTD., Osaka (JP)

( * ) Notice: Subject to any disclaimer, the term of this patent is extended or adjusted under 35 U.S.C. 154(b) by 245 days.

(21) Appl. No.: 14/123,422

(22) PCT Filed: Nov. 30, 2011

(86) PCT No.: PCT/JP2011/077711
§ 371 (c)(1),
(2), (4) Date: Dec. 2, 2013

(87) PCT Pub. No.: WO2012/176350
PCT Pub. Date: Dec. 27, 2012

(65) Prior Publication Data
US 2014/0102065 A1    Apr. 17, 2014

(30) Foreign Application Priority Data

Jun. 22, 2011 (JP) .................................. 2011-138219
Sep. 2, 2011 (JP) .................................. 2011-191410

(51) Int. Cl.
| | |
|---|---|
| *B60K 1/04* | (2006.01) |
| *A01D 34/78* | (2006.01) |
| *A01D 34/00* | (2006.01) |
| *A01D 34/64* | (2006.01) |

(52) U.S. Cl.
CPC ............... *A01D 34/78* (2013.01); *A01D 34/006* (2013.01); *A01D 34/64* (2013.01); *B60K 1/04* (2013.01); *B60K 2001/0416* (2013.01); *B60K 2001/0444* (2013.01)

(58) Field of Classification Search
CPC ............... B60K 1/04; B60K 200/0146; B60K 2001/0444; B60K 2001/04441; B60L 11/18; B60L 11/1818; B60L 11/1877; B60L 11/1879; B60L 1/006; H01M 1/04; H01M 2/043; A01D 34/78
See application file for complete search history.

(56) References Cited

U.S. PATENT DOCUMENTS

| | | | | |
|---|---|---|---|---|
| 3,797,600 | A * | 3/1974 | Miner ................. | A47L 11/4005 104/34 |
| 4,042,054 | A * | 8/1977 | Ward ....................... | B60K 1/04 180/60 |
| 5,077,513 | A * | 12/1991 | Dea ...................... | H01M 2/1072 320/115 |
| 5,559,420 | A * | 9/1996 | Kohchi .................... | B60K 1/04 180/65.1 |
| 5,910,091 | A |  6/1999 | Iida et al. | |
| 6,571,542 | B1 * | 6/2003 | Fillman ................... | A01D 34/58 56/10.2 A |
| 6,994,560 | B2 * | 2/2006 | Kohchi .............. | H01R 13/7036 439/43 |
| 7,439,711 | B2 * | 10/2008 | Bolton ...................... | B60L 7/06 320/132 |

(Continued)

FOREIGN PATENT DOCUMENTS

| | | | | |
|---|---|---|---|---|
| DE | 102009037367 A1 * | 2/2011 | ............... | B60K 1/04 |
| EP | 1188659 A2 | 3/2002 | | |

(Continued)

*Primary Examiner* — Katy M Ebner
(74) *Attorney, Agent, or Firm* — Birch, Stewart, Kolasch & Birch, LLP

(57) ABSTRACT

A battery car 25 which supplies electrical power to a running motor 16 and a mower motor 15 is included, wheels 34, 38 for facilitating the movement is attached to the battery car 25, and the battery car 25 is connected to a rear portion of a chassis 11 in a freely attachable and detachable manner. Moreover, a bracket 50 for connecting the battery car 25 is included in the rear portion of the chassis 11, and a locking shaft 74 to be connected to the bracket 50 is included in the battery car 25.

15 Claims, 35 Drawing Sheets

(56) References Cited

U.S. PATENT DOCUMENTS

| | | | | |
|---|---|---|---|---|
| 7,573,229 | B2* | 8/2009 | Arakelian | H01M 2/1072 320/107 |
| 9,073,535 | B2* | 7/2015 | Jenkins, Jr. | B60W 10/08 |
| 2003/0029149 | A1 | 2/2003 | Fillman et al. | |
| 2003/0082440 | A1* | 5/2003 | Mrotek | H01M 2/043 429/123 |
| 2010/0051364 | A1* | 3/2010 | Arad | B60L 11/18 180/65.31 |
| 2010/0065344 | A1* | 3/2010 | Collings, III | B60L 3/10 180/2.1 |
| 2010/0241298 | A1* | 9/2010 | Sinke | B60K 6/48 701/22 |
| 2010/0291418 | A1* | 11/2010 | Zhou | H01M 2/1005 429/50 |
| 2010/0291427 | A1* | 11/2010 | Zhou | B60L 11/14 429/100 |
| 2011/0240385 | A1* | 10/2011 | Farmer | B60K 1/04 180/65.27 |
| 2012/0186887 | A1* | 7/2012 | Moriguchi | A01D 69/02 180/65.1 |
| 2012/0227369 | A1* | 9/2012 | Koike | A01D 69/02 56/10.2 A |
| 2012/0273285 | A1* | 11/2012 | Jensen | B60K 1/04 180/6.51 |
| 2014/0137528 | A1* | 5/2014 | Schygge | B60K 1/04 56/10.7 |

FOREIGN PATENT DOCUMENTS

| | | |
|---|---|---|
| JP | 60-160002 U | 10/1985 |
| JP | 2-216320 A | 8/1990 |
| JP | 5-46527 U | 6/1993 |
| JP | 9-2081 A | 1/1997 |
| JP | 9-265969 A | 10/1997 |
| JP | 10-084739 A | 4/1998 |
| JP | 11-509798 A | 8/1999 |
| JP | 2001-202942 A | 7/2001 |
| JP | 2002-87351 A | 3/2002 |
| JP | 2002-127761 A | 5/2002 |
| JP | 2002-175791 A | 6/2002 |
| JP | 2002-304974 A | 10/2002 |
| JP | 2010-124697 A | 6/2010 |

* cited by examiner

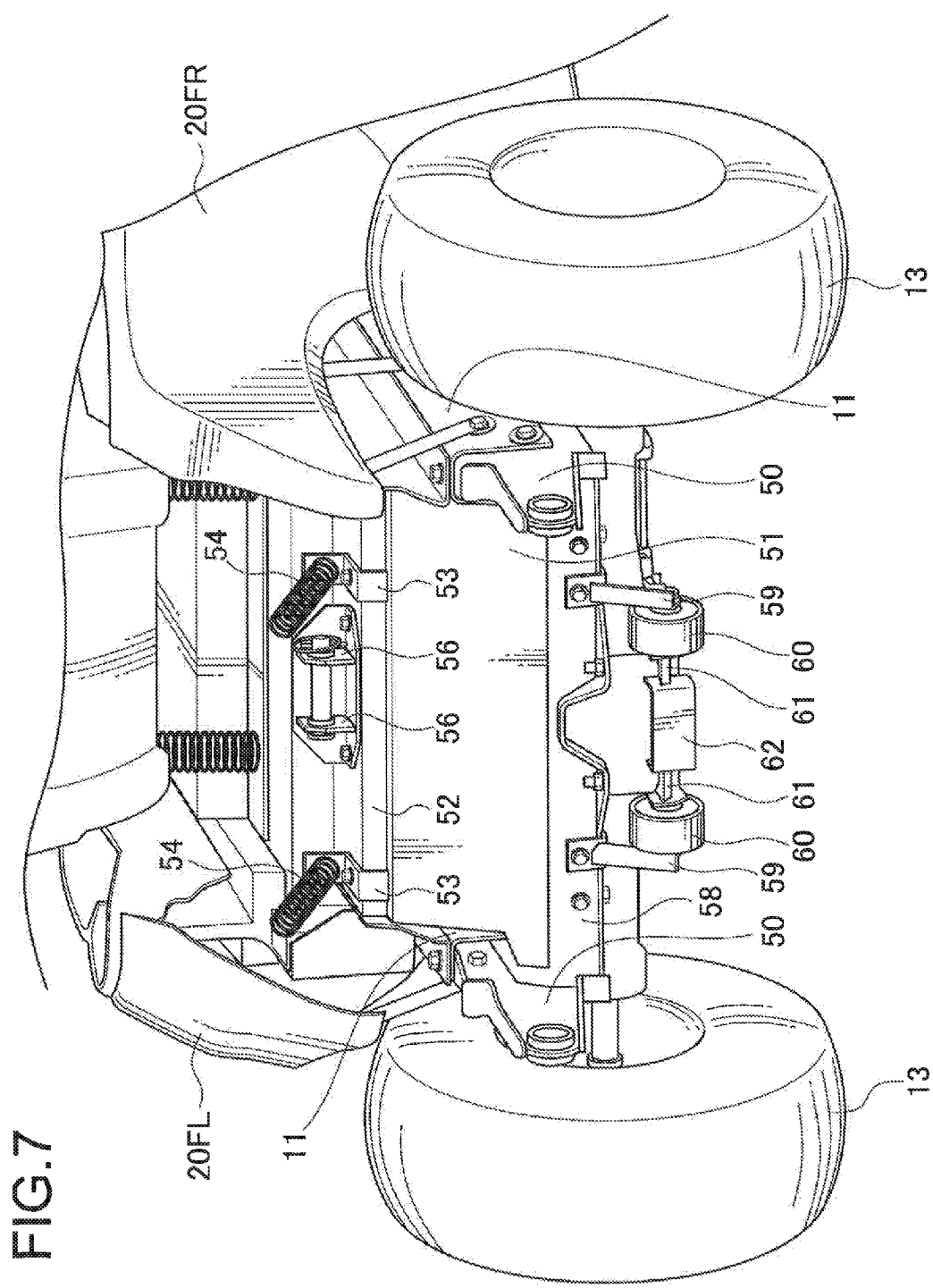

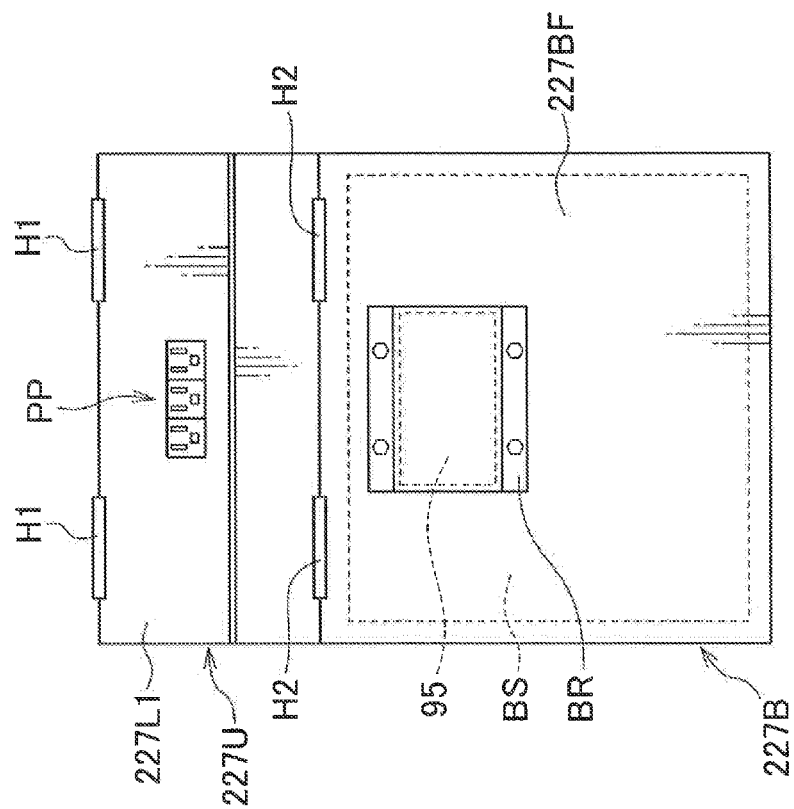
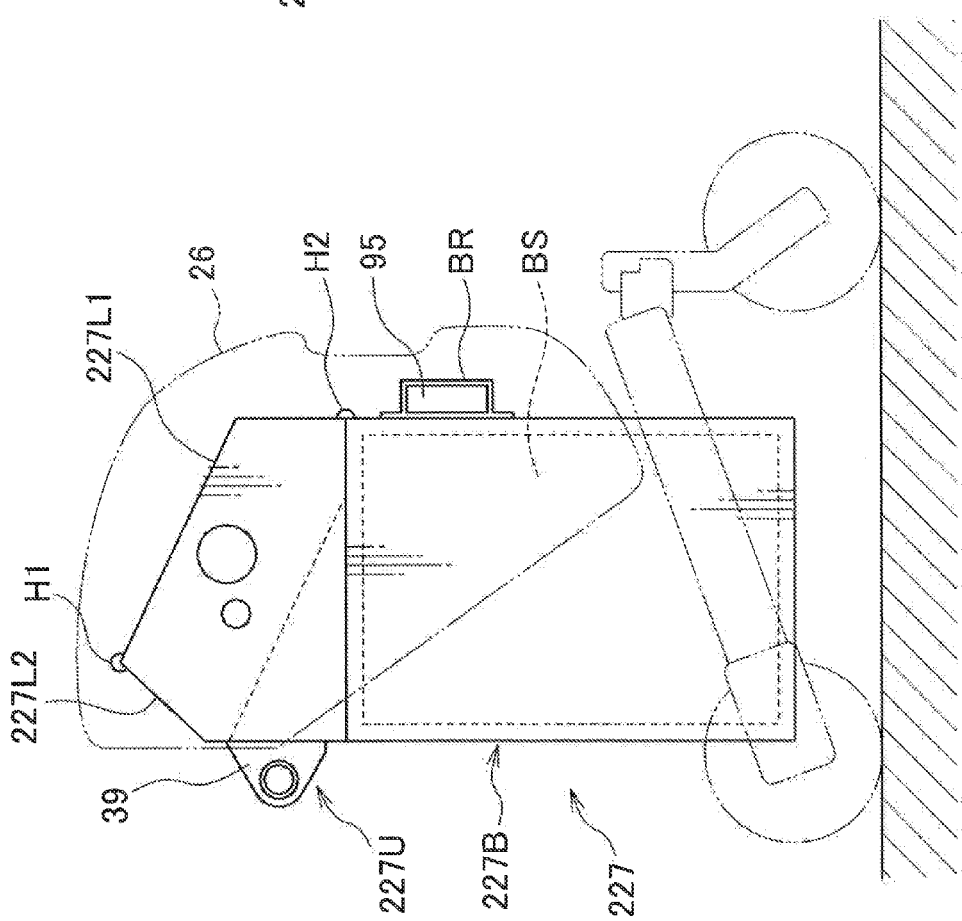

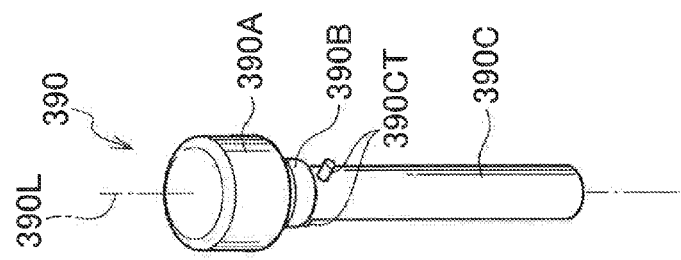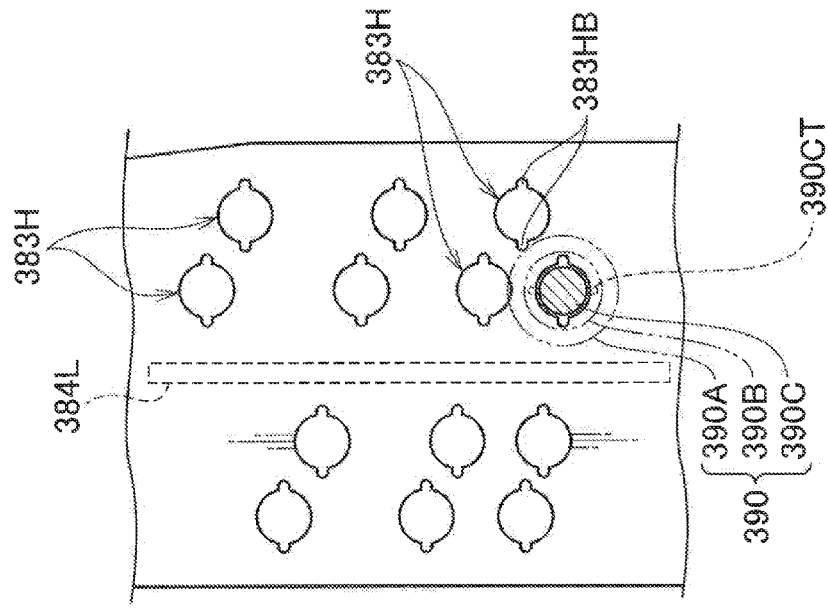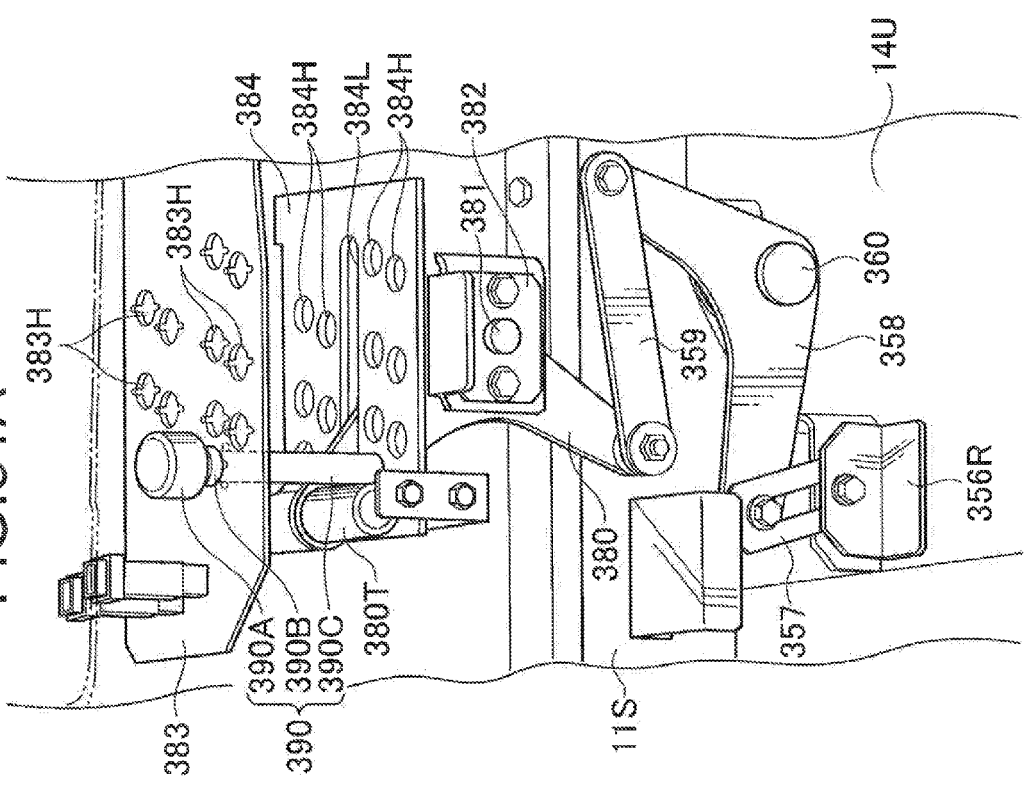

ELECTRIC WORK MACHINE

TECHNICAL FIELD

The present invention relates to an electric work machine that includes a working unit, a working unit motor configured to drive the working unit, running wheels, a running motor configured to rotate the running wheels, and a battery configured to supplying electric power to the working unit motor and the running motor, attaches the wheels for facilitating the movement to the battery, and connects the battery to a rear portion of a chassis in a freely attachable and detachable manner.

BACKGROUND ART

Conventionally, a lawn mower (a work machine) had mowed lawn (grass) by rotating two mower blades substantially horizontally provided within a mower deck in a freely rotatable manner by engine power. Moreover, the lawn mower had been configured to discharge the mowed grass rearward.

CITATION LIST

Patent Literature

Patent Literature 1: JP 11-509798 W

SUMMARY OF INVENTION

Technical Problem

In recent years, from the viewpoint of preventing global warming, movement for restricting the exhaust gas including the greenhouse gas has become a social trend. Correspondence to this movement is remarkable in the automotive industry, and the development of so-called eco cars such as hybrid cars and electric vehicles has proceeded. In particular, in recent years, technical development for commercialization of the electric vehicles using the battery as a power supply has been activated.

However, such technical development is not so much active in the field of the work machine. Particularly, the technical development of the feasible levels has not yet been made in the field of the lawn mower. Therefore, the development of the electrically powered lawn mower has an important significance.

In order to realize an electric lawnmower, it is necessary to secure electric power to a motor for the mower blades, in addition to electric power to a motor for running. In the current storage technology, the battery capable of accumulating the electric power required to drive these motors for one day would become large and heavy. For this reason, when removing the battery while charging or during maintenance, there is a problem in that the attachment and detachment thereof are not easy, and workability is poor. Furthermore, there is a problem in that it is not easy to transport the removed battery. Therefore, the invention provides an electric work machine including a battery that is easily attached and detached, and is easily transported.

Solution to Problem

According to a first aspect of the invention, there is provided an electric work machine that includes a working unit; a working unit motor configured to drive the working unit; running wheels; a running motor configured to rotate the running wheels; and a battery case equipped with a battery that supplies electric power to the working unit motor and the running motor, wheels for facilitating the movement being attached to the battery case, and the battery case being connected to a rear portion of a vehicle body frame in a freely attachable and detachable manner, wherein a body-side connecting portion for connecting the battery case is included in the rear portion of the vehicle body frame, and a battery-side connecting portion to be connected to the body-side connecting portion is included in the battery case.

According to a second aspect of the invention, the working unit is a mower blade, the working unit motor is a mower motor, and the mower blade is rotated by the mower motor to mow grass.

According to a third aspect of the invention, rotating units are included on both side surfaces of the battery case, respectively, a gripping portion is attached to the rotating unit, and the battery-side connecting portion is included at a position that is eccentric from a rotating point of the rotating unit, an abutting portion for keeping the battery case in the rear portion of the vehicle body frame is included, the battery-side connecting portion is rotatably connected to the body-side connecting portion, and by rotating the rotating unit by the gripping portion, the battery case is rotated using the body-side connecting portion as the rotating point and is kept by coming into contact with the abutting portion.

According to a fourth aspect of the invention, the machine further includes a locking mechanism that locks the rotation of the rotating unit of the battery case.

According to a fifth aspect of the invention, the abutting portion includes a body-side fixing portion, the battery case includes a battery-side fixing portion, and the battery case is fixed to the abutting portion by connecting the vehicle body-side fixing portion and the battery-side fixing portion to each other.

According to a sixth aspect of the invention, a buffer portion for reducing impact when brining the battery case into contact with the abutting portion is included in the rear portion of the vehicle body frame.

According to a seventh aspect of the invention, an abut promoting portion for making it easier to keep the battery case in the abutting portion is included in the rear portion of the vehicle body frame.

According to an eighth aspect of the invention, the abutting portion is provided so as to be inclined in the forward direction, the wheels provided in the battery case include a pair of front wheels and a pair of rear wheels, a rear wheel bracket configured to rotatably support the rear wheels and a rear wheel support portion configured to turnably support the rear wheel bracket are attached to the battery case, and a rotation center of the rear wheels is provided so as to deviate with respect to a turning center line of the rear wheel bracket.

According to a ninth aspect of the invention, a cover is provided on the upper portion of the battery case, the cover is freely opened and closed with respect to the battery case, a charging port for charging the battery is included in the cover, and the charging port is exposed by opening the cover.

According to a tenth aspect of the invention, the running wheels are a pair of rear wheels, the pair of rear wheels is included on both outer sides of the rear portion of the vehicle body frame, the electric work machine is able to perform zero-turn, when the battery case is mounted, the rotation center of the rear wheels of the battery case is located in front of the turning center line of the rear wheel bracket, and the rear wheels of the battery case are arranged within a turning circle during the zero-turn.

According to an eleventh aspect of the invention, the battery case includes an upper chamber and a lower chamber, the battery is housed in the lower chamber, and a control unit configured to control an output voltage and an output current of the battery is housed in the upper chamber.

According to a twelfth aspect of the invention, the upper chamber is set to be able to rotate with respect to the lower chamber, a bottom surface of the upper chamber also serves as an upper surface of the lower chamber, and the battery is set to be able to be taken out upward by opening the upper surface of the lower chamber.

According to a thirteenth aspect of the invention, the upper chamber is set to be freely rotated with respect to the lower chamber, and the battery case includes a locking mechanism for restricting the rotation.

According to a fourteenth aspect of the invention, a side surface of the lower chamber is set to be able to be opened, and the battery is housed or taken out of the openable side surface.

According to a fifteenth aspect of the invention, the electric work machine includes an AC-DC converter for converting the electric power of the battery into an alternating current, and an outlet for using the AC power converted by the AC-DC converter, in which the outlet is provided on the surface of the battery case.

According to a sixteenth aspect of the invention, the electric work machine includes a measurement unit configured to measure the voltage and current of the battery, in which a display unit for displaying the measured voltage value and current value, and the display unit is included on the surface of the battery case.

Advantageous Effects of Invention

According to the first aspect of the invention, there is provided an electric work machine that includes a working unit; a working unit motor configured to drive the working unit; running wheels; a running motor configured to rotate the running wheels; and a battery case equipped with a battery that supplies electric power to the working unit motor and the running motor, wheels for facilitating the movement being attached to the battery case, and the battery case being connected to a rear portion of a vehicle body frame in a freely attachable and detachable manner, wherein a body-side connecting portion for connecting the battery case is included in the rear portion of the vehicle body frame, and a battery-side connecting portion to be connected to the body-side connecting portion is included in the battery case.

Thus, it is possible to provide an electric work machine including the battery case that is easily attached, detached, and transported. Furthermore, the battery case can also be used for other applications. For example, when performing a work outdoors not supplied with electricity supply at night, it is possible to move the battery case to a work place so as to be used as a power supply of an illumination, the work machine and the like. Therefore, the use of the battery case is diverse.

According to the second aspect of the invention, the working unit is a mower blade, the working unit motor is a mower motor, and the mower blade is rotated by the mower motor to mow grass. Thus, in the case in which the battery is exhausted during the mowing work of a golf course or the like by the electric work machine, it is also possible to transport and exchange a charged battery provided separately to the golf course. At this time, since the battery is easily attached and detached, it is possible to complete the replacing work in a short time.

According to the third aspect of the invention, rotating units are included on both side surfaces of the battery case, respectively, a gripping portion is attached to the rotating unit, and the battery-side connecting portion is included at a position that is eccentric from a rotating point of the rotating unit, an abutting portion for keeping the battery case in the rear portion of the vehicle body frame is included, the battery-side connecting portion is rotatably connected to the body-side connecting portion, and by rotating the rotating unit by the gripping portion, the battery case is rotated using the body-side connecting portion as the rotating point and is kept by coming into contact with the abutting portion.

Therefore, it is not necessary for a worker to lift the heavy battery case, and it is possible to easily attach the battery case to the vehicle body using the gripping portion with less power. In addition, since the battery case is kept in the abutting portion, it is possible to stably hold the battery case mounted on the vehicle body.

According to fourth aspect of the invention, since the machine further includes a locking mechanism that locks the rotation of the rotating unit of the battery case, it is possible to lock the movement of the gripping portion, except for the work for attaching the battery case to the vehicle body. Thus, when transporting the battery case, the gripping portion is fixed without rotation, it is possible to transport the battery case with the gripping portion, and thus workability is improved.

According to the fifth aspect of the invention, the abutting portion includes a body-side fixing portion, the battery case includes a battery-side fixing portion, and the battery case is fixed to the abutting portion by connecting the vehicle body-side fixing portion and the battery-side fixing portion to each other. Accordingly, when the battery case is mounted on the vehicle body, it is possible to prevent the battery case from dropping out.

According to the sixth aspect of the invention, since the buffer portion for reducing the impact when brining the battery case into contact with the abutting portion is included in the rear portion of the vehicle body frame, it is possible to protect the battery case from impact, and to prevent the damage or the breakdown of the battery case.

According to the seventh aspect of the invention, since the abut promoting portion for making it easier to keep the battery case in the abutting portion is included in the rear portion of the vehicle body frame, it is possible to more easily mount a heavy battery case on the vehicle body.

According to the eighth aspect of the invention, there is provided an electric work machine in which the abutting portion is provided so as to be inclined in the forward direction, the wheels provided in the battery case include a pair of front wheels and a pair of rear wheels, a rear wheel bracket configured to rotatably support the rear wheels and a rear wheel support portion configured to turnably support the rear wheel bracket are attached to the battery case, and a rotation center of the rear wheels is provided so as to deviate with respect to a turning center line of the rear wheel bracket. Accordingly, the battery case is able to change the running direction around the front wheel. For this reason, mobility when carrying alone the battery case is good.

According to the ninth aspect of the invention, the cover is provided on the upper portion of the battery case, the cover is freely opened and closed with respect to the battery case, a charging port for charging the battery is included in the cover, and the charging port is exposed by opening the cover. Thus, the charging port can be protected from dust. Accordingly, it is possible to prevent the trouble of the battery due to dirt and dust.

According to the tenth aspect of the invention, the running wheels are a pair of rear wheels, the pair of rear wheels is included on both outer sides of the rear portion of the vehicle body frame, the electric work machine is able to perform zero-turn, when the battery case is mounted, the rotation center of the rear wheels of the battery case is located in front of the turning center line of the rear wheel bracket, and the rear wheels of the battery case are arranged within a turning circle during the zero-turn. Accordingly, when the electric work machine is subjected to non-running turn (zero-turn), there is no situation in which the battery case becomes an obstacle and disturbs the zero-turn.

According to eleventh aspect of the invention, the battery case includes the upper chamber and the lower chamber, the battery is housed in the lower chamber, and the control unit configured to control an output voltage and the output current of the battery is housed in the upper chamber.

Accordingly, even though the electrolyte solution leaks from the battery, the leaked fluid does not reach the control unit, and thus the breakdown thereof can be prevented. Accordingly, it is possible to provide an electric working vehicle that is easily attached, detached, and transported, and includes the battery case in which the control unit and the battery are housed in the separate chambers. Further, maintenance characteristics of the control unit are improved.

According to the twelfth aspect of the invention, the upper chamber is set to be able to rotate with respect to the lower chamber, the bottom surface of the upper chamber also serves as the upper surface of the lower chamber, and the battery can be set to be taken out upward by opening the upper surface of the lower chamber. Accordingly, it is possible to improve the work efficiency at the time of opening the upper portion of the lower chamber to take out the battery toward the upper part of the lower chamber, or performing the maintenance, by rotating the upper chamber.

According to the thirteenth aspect of the invention, since the upper chamber is set to be freely rotated with respect to the lower chamber, and the locking mechanism for restricting the rotation is included, the upper chamber can rotate only when necessary, and the machine is safe.

According to the fourteenth aspect of the invention, since the side surface of the lower chamber is set to be able to be opened, and the battery is housed or taken out of the openable side surface, the removal of the battery is facilitated.

According to the fifteenth aspect of the invention, since the electric work machine includes an AC-DC converter for converting the electric power of the battery into an alternating current, and an outlet for using the AC power converted by the AC-DC converter, and the outlet is included on the surface of the battery case, it is possible to independently remove the battery from the vehicle body and use the battery as an AC power source. Thus, for example, it is possible to use the lighting apparatus or the light outdoors using the battery.

According to the sixteenth aspect of the invention, the electric work machine includes a measurement unit configured to measure the voltage and current of the battery, and a display unit for displaying the measured voltage value and current value, and the display unit is included on the surface of the battery case. Thus, it is possible to confirm a voltage value and a current value of a battery cell measured by the measurement unit on the display unit as needed.

BRIEF DESCRIPTION OF DRAWINGS

FIG. 7 is a perspective view of a rear portion of a machine body.

FIG. 24A is a side view illustrating still another modified example of the battery case, and FIG. 24B is a front view thereof.

FIG. 31A is a diagram illustrating the height adjustment mechanism of the mower deck, FIG. 31B is a detailed view of an adjustment plate, and FIG. 31C is a perspective view of a height adjustment pin.

DESCRIPTION OF EMBODIMENTS

Figure 1:
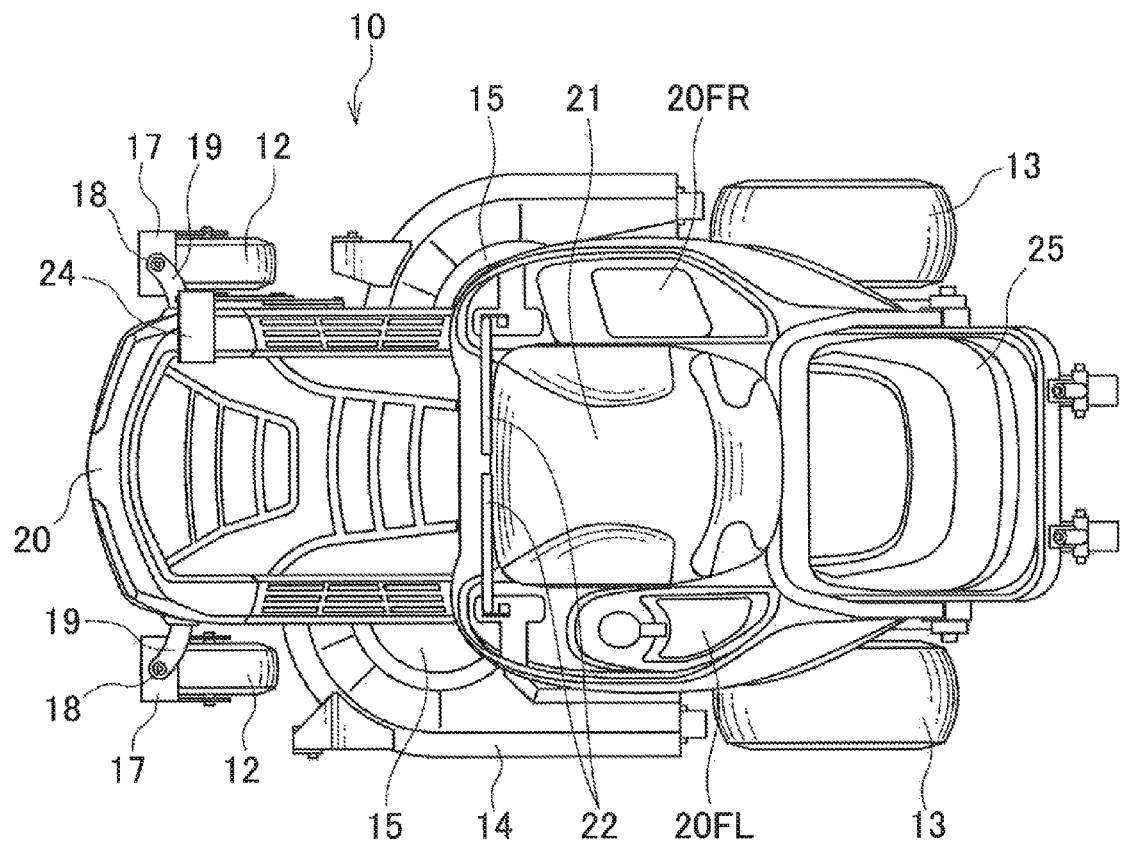
FIG. 1 is a plan view of an electric lawn mower as an example of an electric work machine of the invention.
Figure 2:
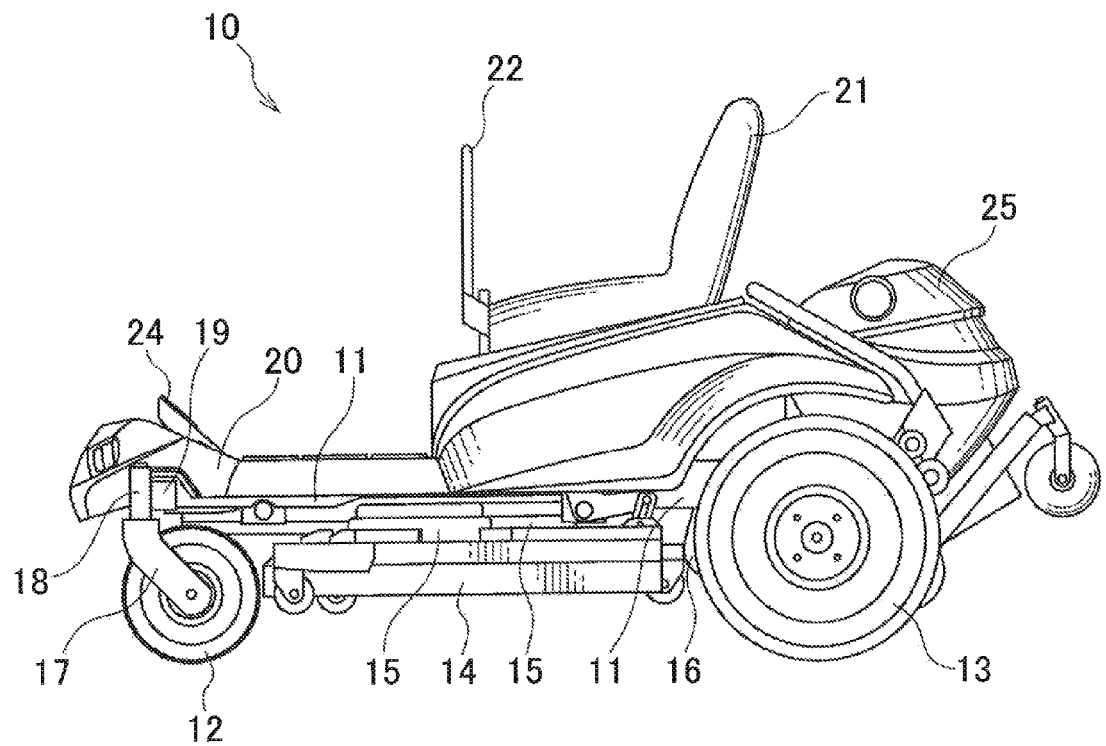
FIG. 2 is a side view thereof.

Hereinafter, the best mode for carrying out the invention will be described in detail with reference to the drawings. FIG. 1 illustrates a plan view of an electric lawn mower 10 as an example of an electric work machine of the invention, and FIG. 2 illustrates a side view thereof. The electric lawn mower 10 includes a chassis (a vehicle body frame: machine body) 11, a pair of front tires 12 located at the front lower part of the chassis 11, and a pair of rear tires (running wheels) 13 located at the rear lower part thereof and the like. In addition, a mower deck 14 is included between the front tires 12 and the rear tires 13. A side surface of a rear portion of the mower deck 14 is opened to discharge the mowed lawn backwards. Two left and right mower blades (working units) (not illustrated) are included inside the mower deck 14 side by side. Mower motors (working unit motors) 15, 15 are attached to the rotation center of the mower blades (the lawn is mowed by rotating the mower blades by the mower motors 15), respectively. Note that the rotation center of the right mower blade becomes slightly backward in the straight direction compared to that of the left side.

A main body cover 20 covers the upper portion of the chassis 11. The main body cover 20 is disposed so as to cover the chassis 11. A driver's seat 21 is provided on the main body cover 20 slightly in front of the rear tire 13. Running operation levers 22, 22 for performing the running operation of the electric lawn mower 10 are each included on the right and left sides of the driver's seat 21.

Note that the electric lawn mower 10 is intended to be covered by the electric motor even while running, in addition to mowing, includes running motors 16 on the inside of the pair of rear tires 13, 13, respectively, and independently drives the pair of rear tires 13, 13 by the running motor 16, respectively (Note that a wheel motor may also be provided within the wheels of the rear tires 13, 13, respectively).

Electric power of two mower motors 15 and two running motors 16 is supplied from a battery car 25. The battery car 25 is provided in the rear portion of the machine body. Specifically, the battery car 25 is disposed between the pair of rear tires 13 and 13 and in the rear end of the chassis 11 in the freely attachable and detachable manner. The battery car 25 includes four driven type wheels. The battery car 25 is configured to be able to be moved from the machine body by being removed by a worker to be pushed or pulled. Note that the battery car 25 includes a cover, and when opening a lid of the cover, a charging port is exposed. Furthermore, a battery controller for correcting a small fluctuation of voltage of the battery car 25 is included in the cover.

A control unit (not illustrated) is provided below the driver's seat 21. The control unit includes a motor driver or the like. The motor driver controls the running motor 16 of the electric lawn mower 10, and controls the rotational direction and the rotational speed of the running motor 16 depending on an amount of tilt of the running operation lever 22. Furthermore, another motor driver performs the rotation control of mower motor 15. These motor drivers include a radiator plate for radiating heat emitted by itself in the lower portion thereof. The radiator plate is arranged so as to be exposed to the lower part of the chassis 11. Note that the rotational speed of the mower motor 15 is controlled so as to be linked to the rotational speed of the running motor 16. That is, when accelerating the running speed, the rotational speed of the mower blade is also accelerated, and when dropping the running speed, the rotational speed of the mower blade also becomes slow.

The front tires 12, 12 are attached to a tire bracket 17 via a shaft in a freely rotatable manner, respectively (that is, the front tires 12 are subjected to driven rotation relative to the tire bracket 17). The tire bracket 17 is formed in a gate shape, and a through hole is provided in the center of the upper portion surface portion. The shaft is fixed to the through hole by welding by passing through the through hole upward, and the shaft is rotatably fixed within a cylindrical tire post 18. Accordingly, the tire bracket 17 is made freely rotatable relative to the tire post 18.

One end of the front frame 19 is fixed to the side surface of the tire post 18. The front frame 19 is formed in an arc shape. The other end of the front frame 19 is fixed to the chassis 11.

A height adjustment pedal 24 for adjusting the height of the mower deck 14 is included in the right side of the front portion of the chassis 11.

The running operation lever 22 is provided so as to be tiltable, and when a driver pushes the lever forward, the running motor 16 rotates in the forward direction via the motor driver. On the other hand, when the running operation lever 22 is pushed backward, the running motor 16 rotates in the backward direction. Furthermore, the rotational speed of the running motor 16 changes by a tilting degree of the running operation lever 22. That is, when the running operation lever 22 is greatly pushed forward (backward), the running motor 16 rotates fast in the forward (backward) direction, and when the running operation lever 22 is slightly pushed forward (backward), the running motor 16 slowly rotates in the forward direction (backward direction). A driver is able to perform straight backward, left and right folding, turning or the like, by suitably operating running operation levers 22, 22 back and forth.

Moreover, a right fender 20FR of the driver's seat 21 is provided with a mowing switch configured to turn the rotation of the mower blades ON, and OFF, a height adjustment mechanism of the mower deck 14 and the like. The mowing switch is a limit type switch, the switch is turned ON when pressed down by a finger of the driver, and the switch is turned OFF when pressed down again. Furthermore, by operating the height adjustment mechanism of the mower deck 14, while operating a deck lifting pedal 24 with a right foot, it is possible to adjust the height of the mower deck 14 (described below). The left fender 20FL of the driver's seat 21 is provided with a tray for placing a cup folder, an accessory cup or the like.

Figure 3:
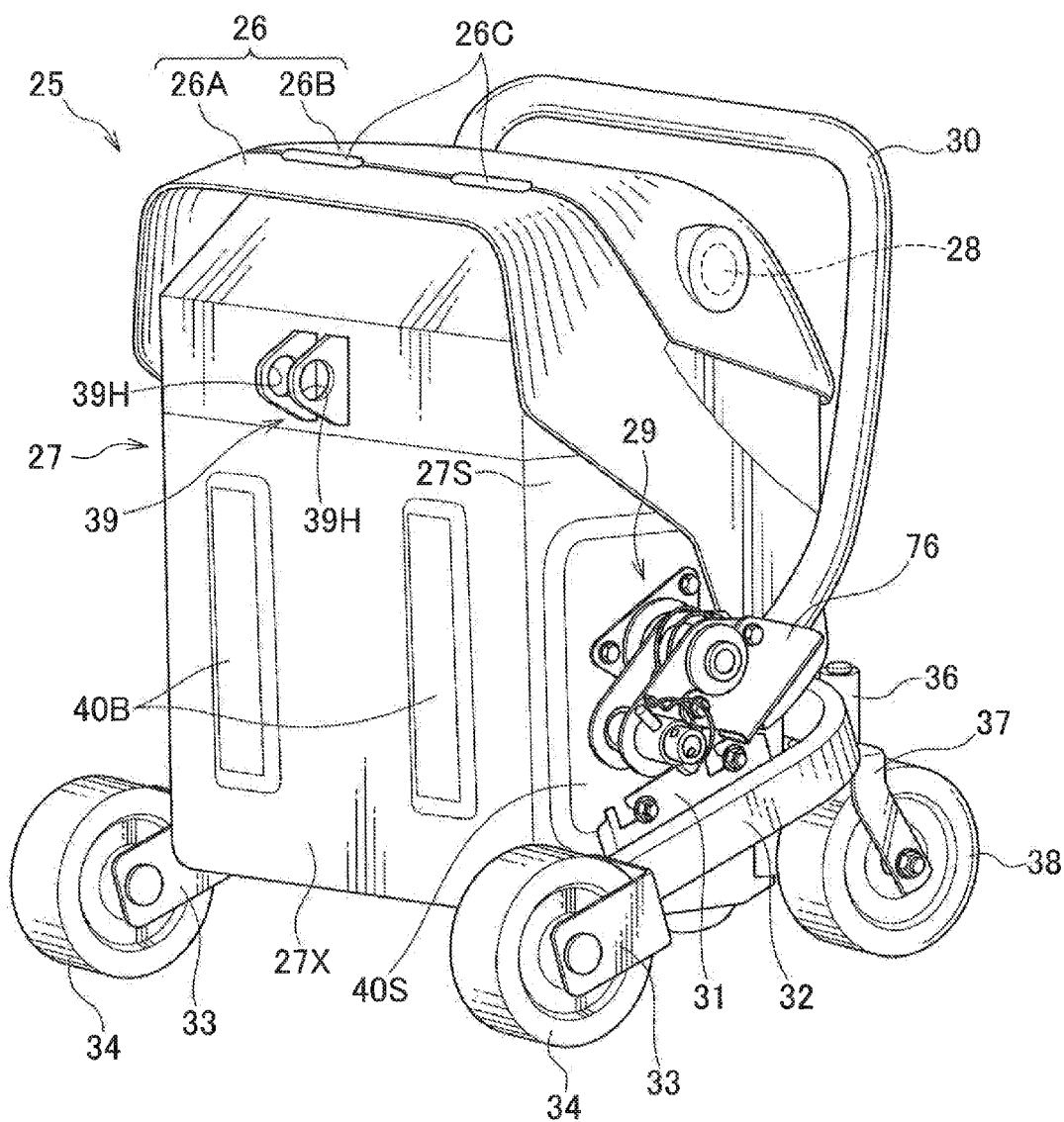
FIG. 3 is a perspective view from a left front of a battery case.
Figure 4:
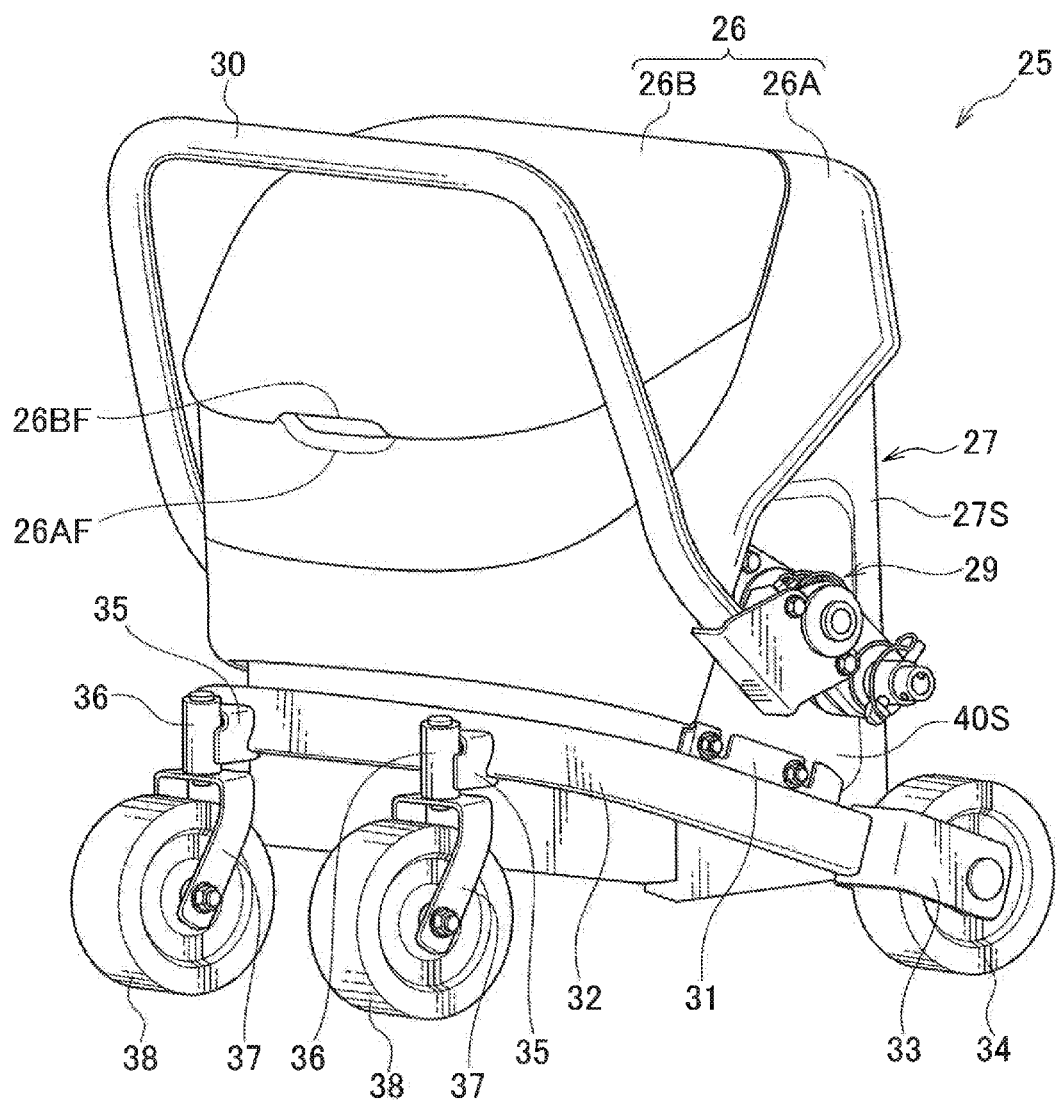
FIG. 4 is s a perspective view from a right rear of the battery case.
Figure 5:
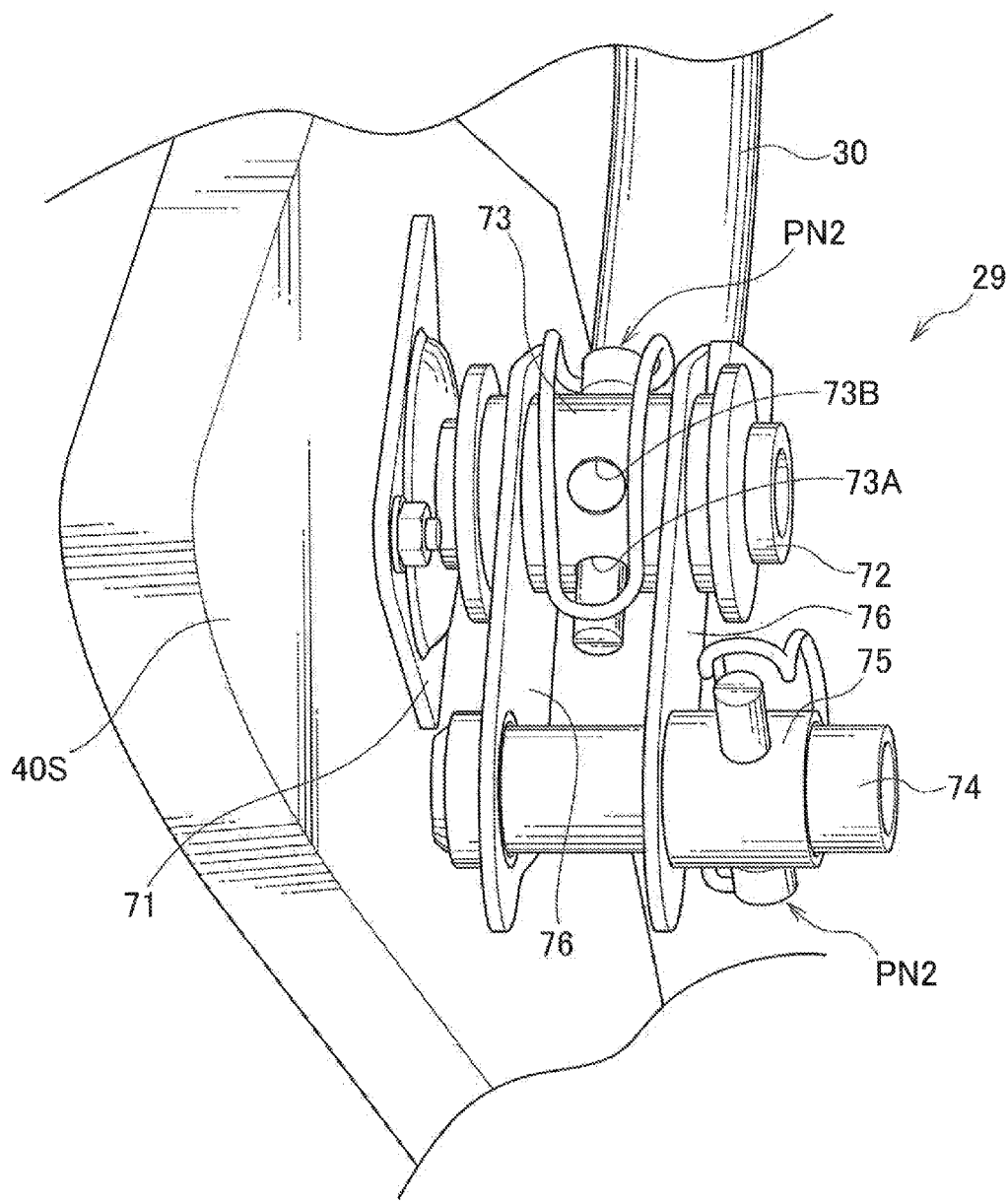
FIG. 5 is an enlarged perspective view of a rotating unit.
Figure 6A:
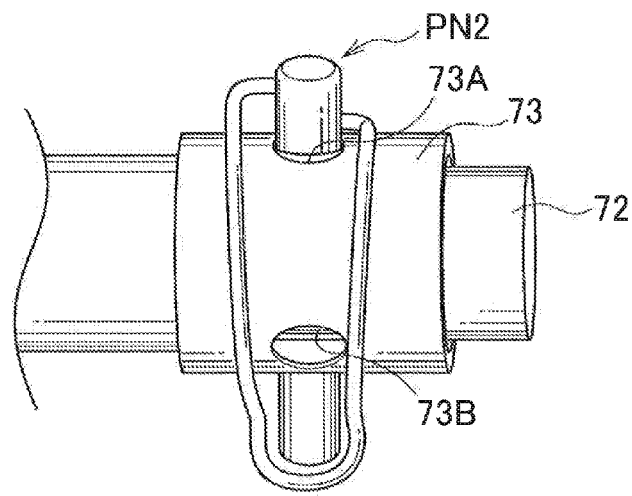
FIG. 6A is a schematic view of the periphery of a cylindrical portion.
Figure 6B:
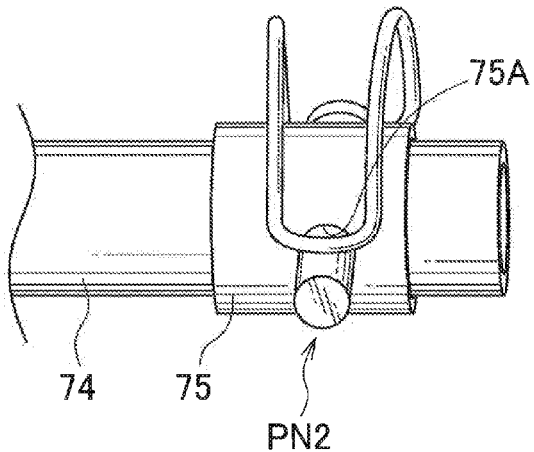
FIG. 6B is a schematic view of a locking shaft.
Figure 6C:
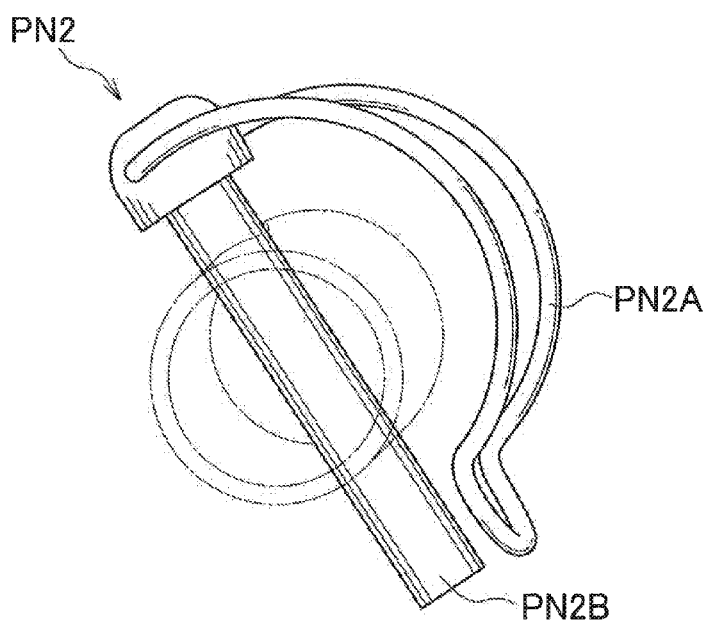
FIG. 6C is a perspective view of a retaining pin.

In FIGS. 3 and 4 illustrate the details of the battery car 25. The battery car 25 is covered from above by a cover 26 that is freely opened and closed. The cover 26 is configured so that a cover body 26A and a lid portion 26B are connected to each other via a hinge. The cover body 26A is made of a hard resin, and is attached to the battery case 27 so as to cover the battery case 27 from above. The lid portion 26B is made of a resin similar to the cover body 26A, and is freely rotatable with respect to the cover body 26A around hinges 26C. Note that a recess 26BF is provided in the lower end of the lid portion 26B. Meanwhile, at a position of the cover body 26A adjacent to the recess 26BF, a recess 26AF is provided. The recess 26BF is formed so that a worker easily puts his hand thereon when opening and closing the lid portion 26B, and the recess 26AF becomes an escape at the time of putting the hand on the recess 26BF, when the lid portion 26B is opened and closed.

Metal plates 26BF (not illustrated) are attached to the lower end of the lid portion 26B at two positions, and a magnet is attached to a position of the cover body 26A with which the metal plates come into contact when closing the lid portion 26B. Thus, the lid portion 26B is adapted to be fixed to the cover body 26A by constant force. The upper portion of the battery case 27 is exposed when opening the lid portion 26B. The upper portion of the battery case 27 includes a charging port 28 for inserting the plug when charging the battery case 27. The charging port 28 includes a normal charging plug for inserting an electrical cord of a domestic power supply to charge the battery car 25 and a rapid charging plug having a larger diameter than the plug. An AC adapter, a charging device, and a battery (a storage battery) are included in the battery case 27.

Reinforcing portion 40S, 40S are formed on both side surfaces 27S of the battery case 27. The reinforcing portions 40S are formed by punching a metal plate constituting the side surface 27S, and is intended to reinforce the side surface 27S. Rotating units 29 are disposed on the reinforcing portions 40S, respectively (the rotating units 29 are suitably connected to the battery case 27 on the inside of the reinforcing portion 40S). Both ends of a gripping portion 30 are fixed to the rotating units 29 by welding, respectively. The gripping portion 30 is formed in a substantially gate shape by bending a metal pipe. The gripping portion 30 rotates around the rotating unit 29 relative to the battery case 27 (the details of the rotating unit 29 will be described below). Note that it is desirable that a rotating point of the rotating unit 29 be located near the center of gravity of the battery case 27. A wheel frame 32 is attached to both side surfaces 27S of the lower portion of the battery case 27 via an attaching plate 31, respectively. The attaching plate 31 is fixed to the wheel frame 32 by welding or the like. The attaching plate 31 is fixed to the side surface 27S by means of bolts.

The wheel frame 32 has a square tubular shape, and is formed by being bent in a substantially U shape. The front wheel brackets 33, 33 are fixed to both ends of the wheel frame 32 by welding or the like. The front wheel bracket 33 is formed in the gate shape by bending the metal plate twice substantially at a right angle. Through holes are formed on both side surfaces thereof, and the front wheel (wheel) 34 is rotatably attached via bolts or the like. On the other hand, attaching portions 35, 35 are fixed to the central portion of the wheel frame 32 by welding or the like. The side surface of the cylindrical portion (rear wheel support portion) 36 is fixed to the attaching portion 35. The rear wheel bracket 37 is attached to the cylindrical portion 36 in a freely turnable manner. The rear wheel bracket 37 is formed in a gate shape, and through holes are provided in the center of the upper portion surface portion. The bolts are passed through the through holes upward, and are fixed in the cylindrical portion 36. Thereby, the rear wheel bracket 37 is supported with respect to the cylindrical portion 36 in a freely rotatable manner. The rear wheel bracket 37 is formed in a gate shape by bending metal plate twice substantially at a right angle. Through holes are formed on both side surfaces, and the rear wheel (wheel) 38 is attached via a bolt or the like in a freely rotatable manner. In this way, the rear wheel 38 can rotate around the cylindrical portion 36.

A bracket (a battery-side fixing portion) 39 is fixed to the upper center of a back 27X of the battery case 27. The bracket 39 is constituted by a pair of metal plates, and includes a through hole 39H in the center thereof, respectively. On the back 27X, a pair of reinforcing portions 40B, 40B is formed so as to extend in the vertical direction. The reinforcing portions 40B are formed by punching the metal plate forming the back 27X.

As illustrated in FIG. 5, and FIGS. 6A to 6C, the rotating unit 29 provided on both side surfaces 27S of the battery case 27 includes a rotating shaft (a rotating fulcrum) 72, a bracket 76 and a bracket 76 fixed to the rotating shaft 72, a locking shaft (a battery-side connection portion) 74 capable of being inserted into the brackets 76, a cylindrical portion 73 fixed to the inner side of the bracket 76 (the rotating shaft 72 is freely rotatable relative to the cylindrical portion 73), a cylindrical guide portion 75 fixed onto the outer side of the bracket 76 (the locking shaft 74 can be inserted into the inner side of the guide portion 75 in a freely inserted and disconnected manner). Accordingly, the locking shaft 74 is located at a position that is eccentric relative to the rotating shaft 72.

In the cylindrical portion (the locking mechanism) 73, a through hole 73B and a through hole 73A of the same diameter are formed so as to penetrate in the radial direction. Meanwhile, in the rotating shaft 72, through holes having substantially the same diameter as the through holes 73A and 73B are formed so as to penetrate in the radial direction. A locking pin (a locking mechanism) PN2 can be inserted into the through holes 73A and 73B and the through holes of the rotating shaft 72 (in FIGS. 3A and 3B, referred to as a transport position to be described below in a state in which the locking pin PN2 is inserted into the through hole 73A). Furthermore, a through hole 75A is formed in the guide portion 75 so as to penetrate in the radial direction. Furthermore, substantially the same through hole as the through hole 75A is also formed in the locking shaft 74 so as to penetrate the radial direction. The locking pin PN2 can be inserted into the through hole 75A of the guide portion 75 and the through hole of the locking shaft 74. The locking pin PN2 includes a head portion and an insertion portion PN2B, and a latching portion PN2A is attached to the head portion in a freely rotatable manner. The rotating shaft 72 is supported by a rotating support portion 71 in a freely rotatable manner. The rotating support portion 71 is attached to the battery case 27 by bolts. The locking shaft 74 can be inserted into a guide portion 50G of a bracket 50 to be described below. Note that the cylindrical portion 73 and the locking pin PN2 are collectively referred to as a locking mechanism.

Figure 8:
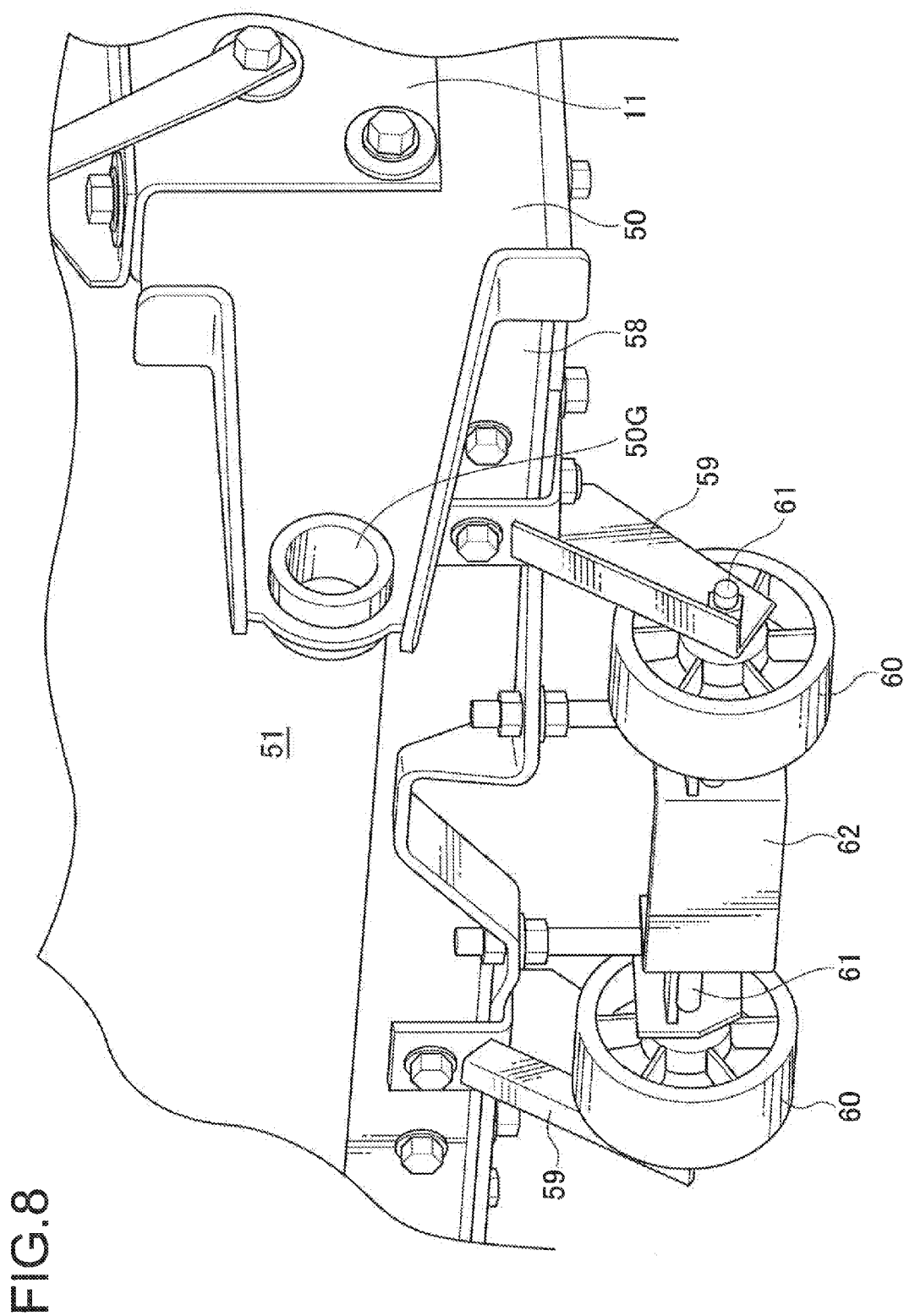
FIG. 8 is an enlarged view a main portion thereof.
Figure 9:
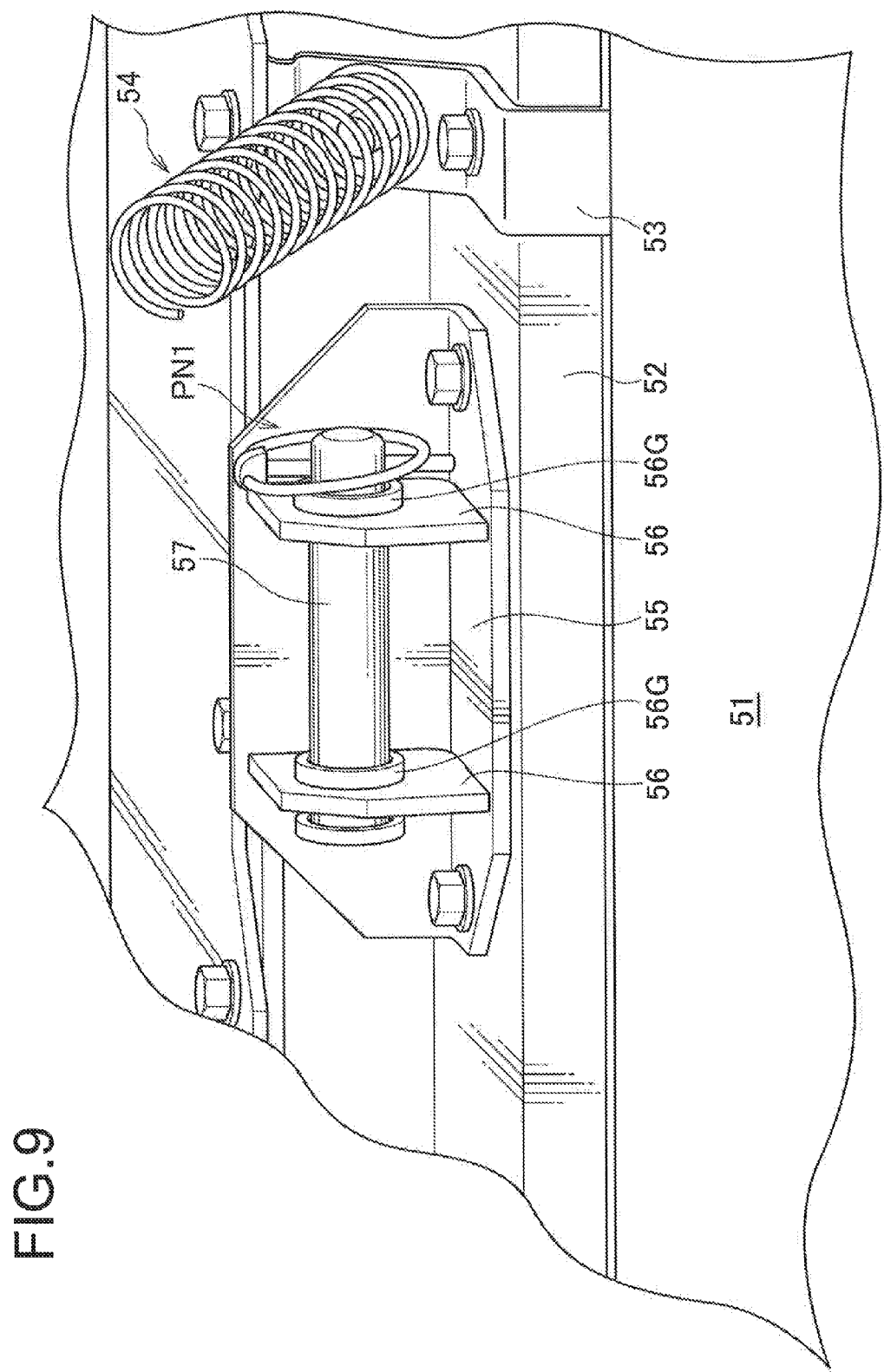
FIG. 9 is an enlarged view of another main portion of FIG. 5.

As illustrated in FIGS. 7 to 9, on both side surfaces of the rear end of the chassis 11, the brackets (body-side connecting portions) 50, 50 are fixed by bolts. A through hole is formed at the rear end of the bracket 50, and a cylindrical guide portion 50G is fixed thereto and is fixed by welding or the like. The abutting portion 51 is fixed to the rear portion of the chassis 11 by bolts. Since the abutting portion 51 is formed by processing a metal plate, and the main portion thereof is a plane formed so as to be inclined toward the forward direction, the battery car 25 is caused to lean against and come into contact with the planar portion (Note that the abutting portion 51 is not limited to this shape, may have a shape capable of keeping the back 27X of the battery car 25, and may be constituted by a plurality of members). A rubber plate (a buffer portion) (not illustrated) is stuck on the surface of the abutting portion 51, and is configured to reduce the impact when leaning against and coming into contact with the battery car 25. An attaching portion 52 is provided on the abutting portion 51, and a pair of brackets 53, 53 is attached onto both side surfaces of the attaching portion 52. A coil spring (a buffer portion) 54 is attached onto the upper side of the brackets 53, respectively. A bracket (a body-side fixing portion) 56 is fixed between the bracket 53, 53 via the bracket 55. Note that the buffer portion is not limited to the coil spring 54, and can be applied to every elastic member.

The bracket 56 is constituted by a pair of metal plates and formed with a through hole in the center thereof. A cylindrical guide portion 56G is inserted to the through hole and fixed to the bracket 56 by welding or the like. A locking rod 57 is inserted to the guide portion 56G. The locking rod 57 is formed of a metal rod, and performs the retaining by forming one end thereof as a flat head. Note that a through hole is radially formed at the other end thereof. A fixing pin PN1 is fitted to the through hole. The head portion of the fixing pin PN1 is provided with a ring for hooking a finger or the like thereto when being drawn out. In addition, a gap between the brackets 56, 56 is formed to be wider than a gap between the brackets 39, 39 (the battery-side fixing portions) included in the battery car 25, and the attaching brackets (battery-side fixing portion) 39, 39 are configured so as to be disposed between the brackets 56, 56. Furthermore, the through hole 39H formed in the bracket 39 is formed in a size of the degree that the locking rod 57 is freely inserted or removed.

A transverse frame 58 is arranged to be fixed between the chassis 11 below the abutting portion 51, and the pair of brackets 59, 59 is connected to the transverse frame 58. A roller (an abut promoting portion) 60 is attached to the bracket 59 in a freely rotatable manner. The roller 60 includes a tire portion made of a rubber and a wheel portion for supporting the tire portion from the inside. The through hole is formed in the center of the wheel portion, and a support shaft 61 is inserted thereto. The roller 60 is freely driven to rotate around the support shaft 61. One end of the support shaft 61 is fixed to the bracket 59, and the other end thereof is fixed to a receiving portion 62. The receiving portion 62 is fixed to the transverse frame 58. As will be described below, the roller 60 is intended to facilitate the operation of keeping the abutting portion 51 in the battery car 25. Note that the abut promoting portion is not intended to be limited to the roller 60, and as long as the same effect can be achieved, the abut promoting portion may have any shape.

Figure 10:
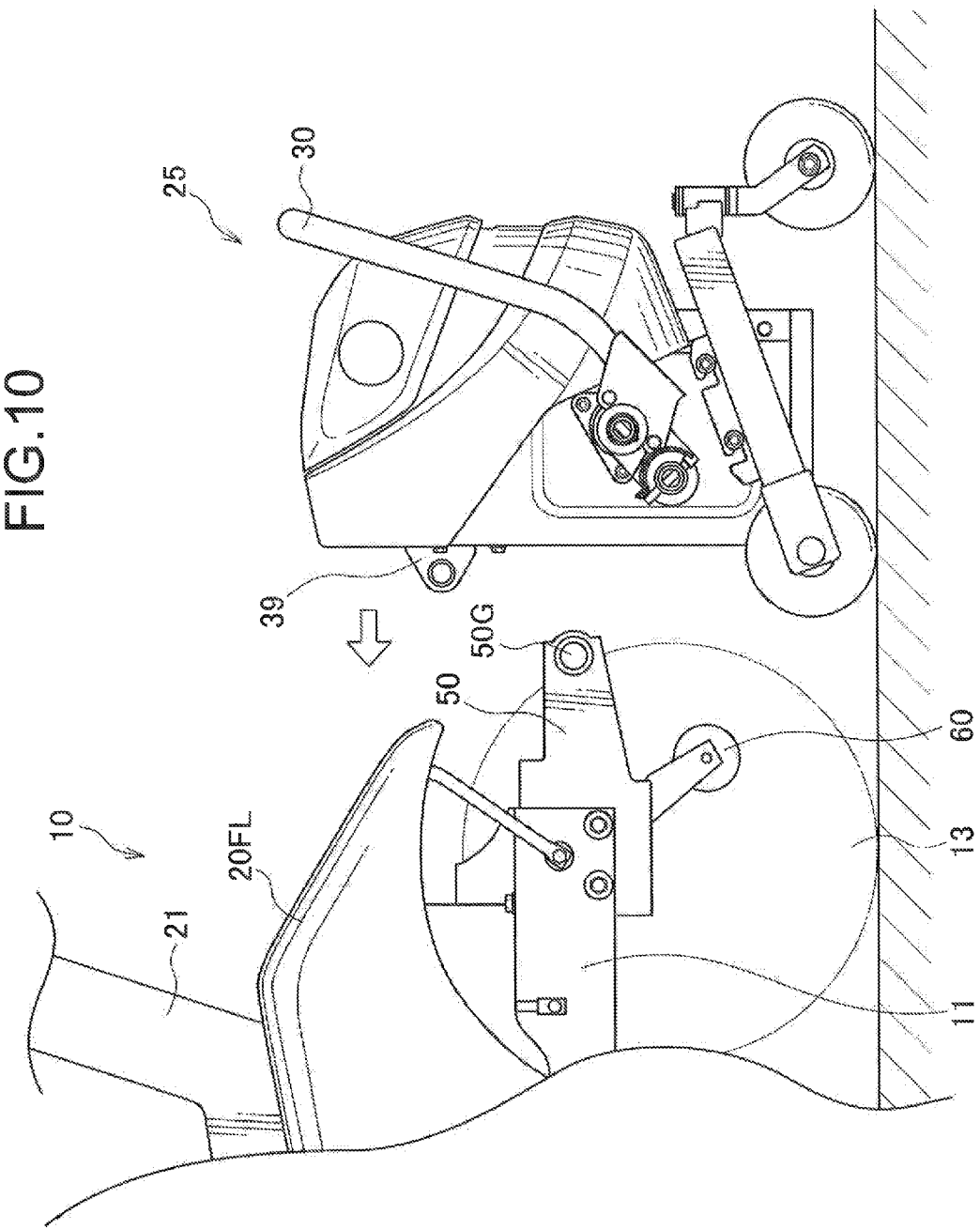
FIG. 10 is a diagram illustrating an aspect of attaching the battery case to the rear portion of the machine body.
Figure 11:
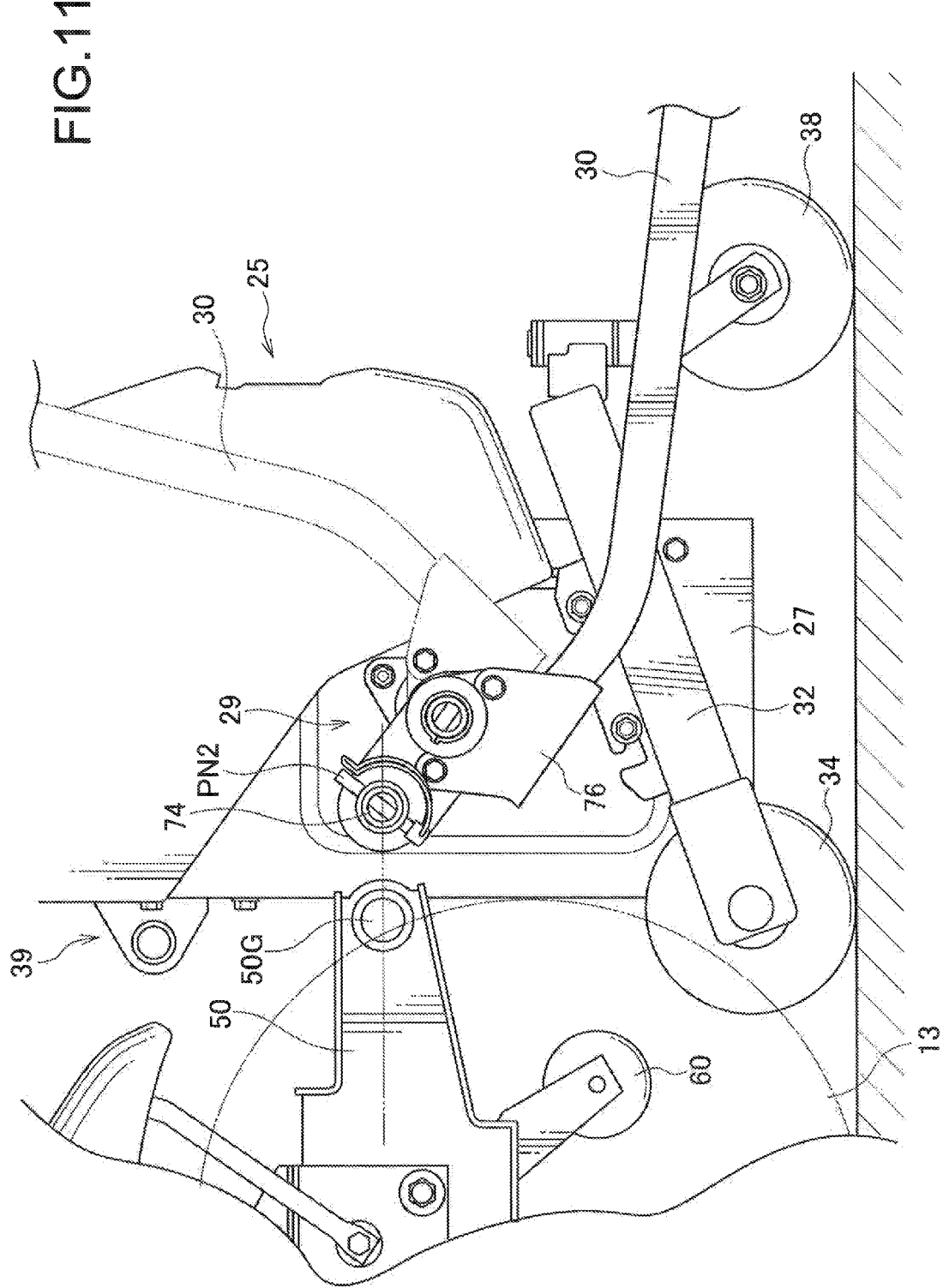
FIG. 11 is an enlarged view of the main portion illustrating an aspect of attaching the battery case to the rear portion of the machine body.

In the electric lawn mower 10 configured in this manner, the battery car 25 can be charged by being removed and independently moved. A method of attaching charged battery car 25 to the main body of the electric lawn mower 10 will be described later. As illustrated in FIG. 10, the battery car 25 is pressed while gripping the gripping portion 30 of the battery car 25 to get closer to the main body (the chassis 11 side) of the electric lawn mower 10. Next, as illustrated in FIG. 11, the gripping portion 30 is rotated from the transport position to the attaching position (see also FIGS. 5 and 6A to 6C). Specifically, when a latching portion PN2A of a locking pin PN2 inserted into the cylindrical portion 73 is rotated away from the insertion portion PN2B, the lock of the locking pin PN2 is released, and the locking pin PN2 is drawn out of the through hole 73A of the cylindrical portion 73.

Accordingly, the gripping portion 30 is made rotatable about the rotating shaft 72, thereby rotating the gripping portion 30 forward. Moreover, the through hole of the rotating shaft 72 and the through hole 73B of the cylindrical portion 73 are joined together, and the insertion portion PN2B of the locking pin PN2 is inserted thereto. In addition, the latching portion PN2A is rotated up to the vicinity of the insertion portion PN2B to prevent the locking pin PN2 from drawing out of the cylindrical portion 73. In this manner, the gripping portion 30 is located at the attaching position as illustrated in FIG. 11 (in FIG. 11, a dashed line illustrates a state in which the gripping portion 30 is located at the transport position).

Moreover, the battery car 25 is caused to further get closer to the main body. Next, the latching portion PN2A of the locking pin PN2 inserted into the locking shaft 74 is rotated away from the insertion portion PN2B to pull the locking shaft 74 out of the guide portion 75 and the locking pin PN2. In addition, the locking shaft 74 is drawn out of the bracket 76 and the guide portion 75. In this state, the battery car 25 is caused to get closer to the main body so that the bracket 50 of the main body-side is located between the brackets 76 of the battery-side. In addition, the guide portion 75 and the guide portion 50G are joined together to insert the locking shaft 74 into both guide portions. Moreover, by inserting the locking pin PN2 to the guide portion 75 and the locking shaft 74 again, the locking shaft 74 is prevented from drawing out. In this way, the battery car 25 is connected the chassis (machine body) 11 of the electric lawn mower 10.

Figure 12A:
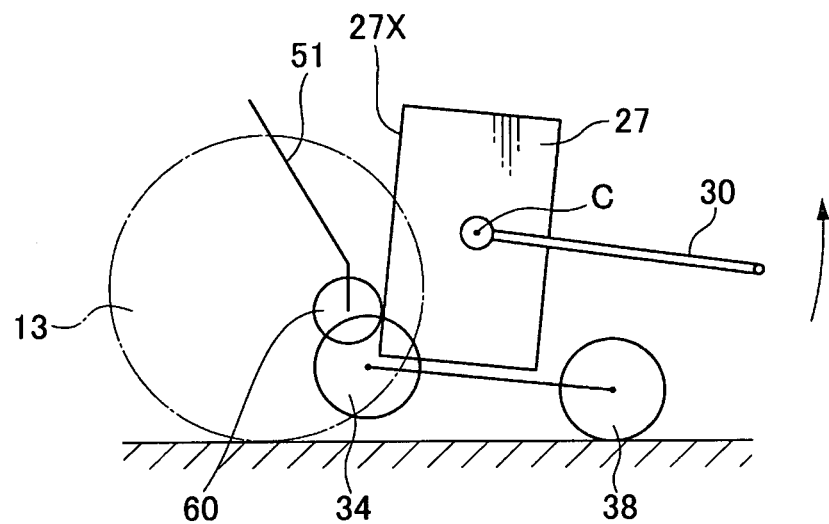
FIGS. 12A and 12B are diagrams illustrating a procedure for attaching the battery case to the rear portion of the machine body.

Moreover, as illustrated in FIG. 12A, when the gripping portion 30 is rotated in the arrow direction (a counterclockwise direction in FIG. 12A), a front wheel 34 of the battery car 25 floats, and the back 27X of the battery case 27 comes into contact with the roller 60. At this time, since the tire portion of the roller 60 is made of a rubber, it is possible to reduce the impact to the battery case 27 due to the contact. Note that reference numeral C indicates a rotation center of the rotating unit 29 (that is, the gripping portion 30).

Figure 12B:
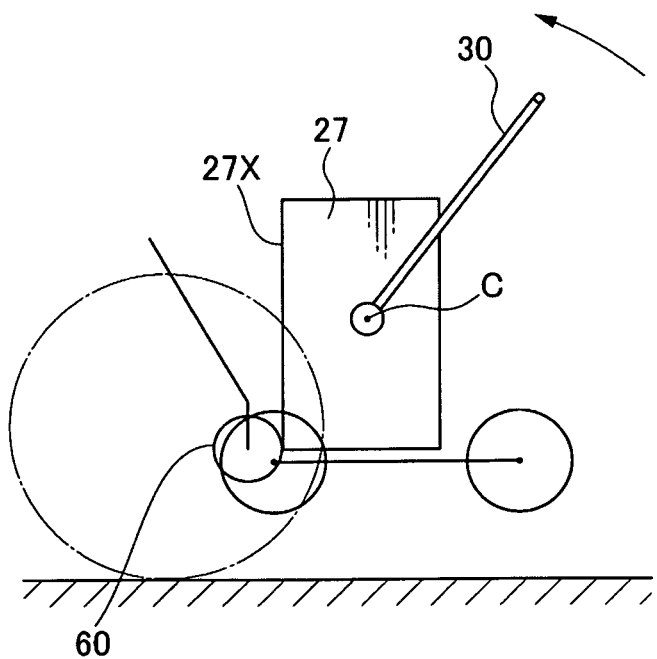

When the gripping portion 30 is further rotated in the direction of the arrow, the back 27X of the battery case 27 moves while coming into contact with the roller 60. Since the roller 60 is freely rotatable, the roller 60 facilitates the movement of the battery case 27. The battery car 25 rotates around the locking shaft (a connecting portion between the battery car 25 and the machine body of the electric lawn mower 10) 74, while coming into contact with the roller 60 (FIG. 12B). At this time, since the reinforcing portions 40B, 40B are formed at the position where the two rollers 60, 60 come into contact with each other, it is possible to prevent the back 27X from being deformed by the roller 60.

Figure 13A:
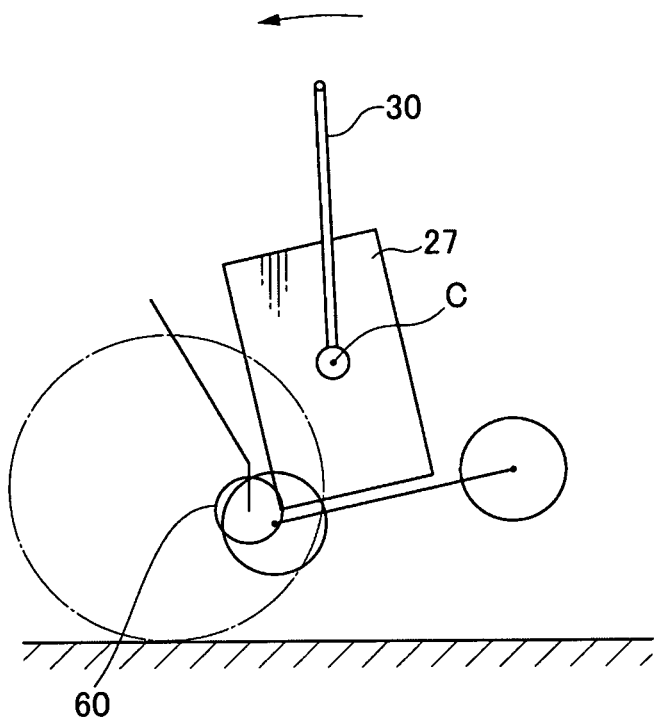
FIGS. 13A and 13B are diagrams illustrating a procedure for attaching the battery case to the rear portion of the machine body.
Figure 13B:
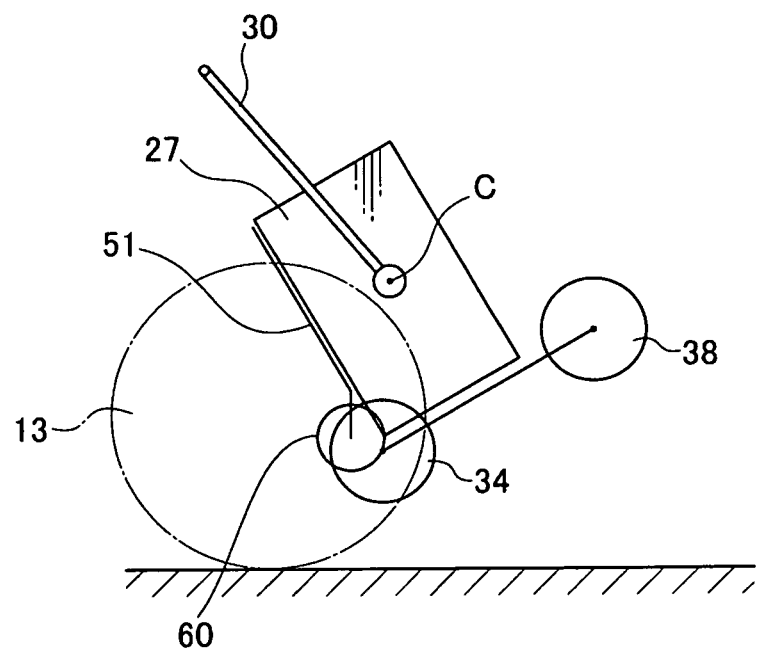

Furthermore, by rotating the gripping portion 30 in the direction of the arrow (FIG. 13A) to bring the back 27X of the battery case 27 into contact with the abutting portion 51, the operation of keeping the battery car 25 in the vehicle body of the electric lawn mower 10 is completed (FIG. 13B). At this time, since a rubber plate (an buffer portion) disposed on the surface of the abutting portion 51 and a coil spring (an buffer portion) 54 receive the back 27X of the battery car 25, it is possible to reduce the impact when the back 27X is brought into contact with the abutting portion 51 (The buffer portion may not be included. Furthermore, as the buffer portion, only either of the rubber plate or the coil spring 54 may be disposed).

Note that before the work of attaching the battery car 25 to the machine body is started (or during the work), a locking rod 57 inserted into the brackets 56, 56 attached to a body rear portion (a body-side fixing portion) is drawn out in advance. Specifically, a fixing pin PN1 inserted into a leading end of the locking rod 57 in the radial direction is drawn out, and after releasing the latching, the locking rod 57 is drawn out of the bracket 56. Moreover, when the back 27X of the battery case 27 comes into contact with the abutting portion 51, a bracket (a battery-side fixing portion) 39 is disposed between the brackets 56, the through hole 39H and the guide portion 56G are joined together, and the locking rod 57 is inserted thereto. When the insertion is finished, the fixing pin PN1 is inserted and latched to the leading end of the locking rod 57. Thus, the battery car 25 is fixed to the machine body.

Note that a cord having a coupler is included in each of the battery car 25 side, and the machine body-side, and electric power of the battery car 25 can be supplied to the machine body-side by connecting both couplers.

Figure 14A:
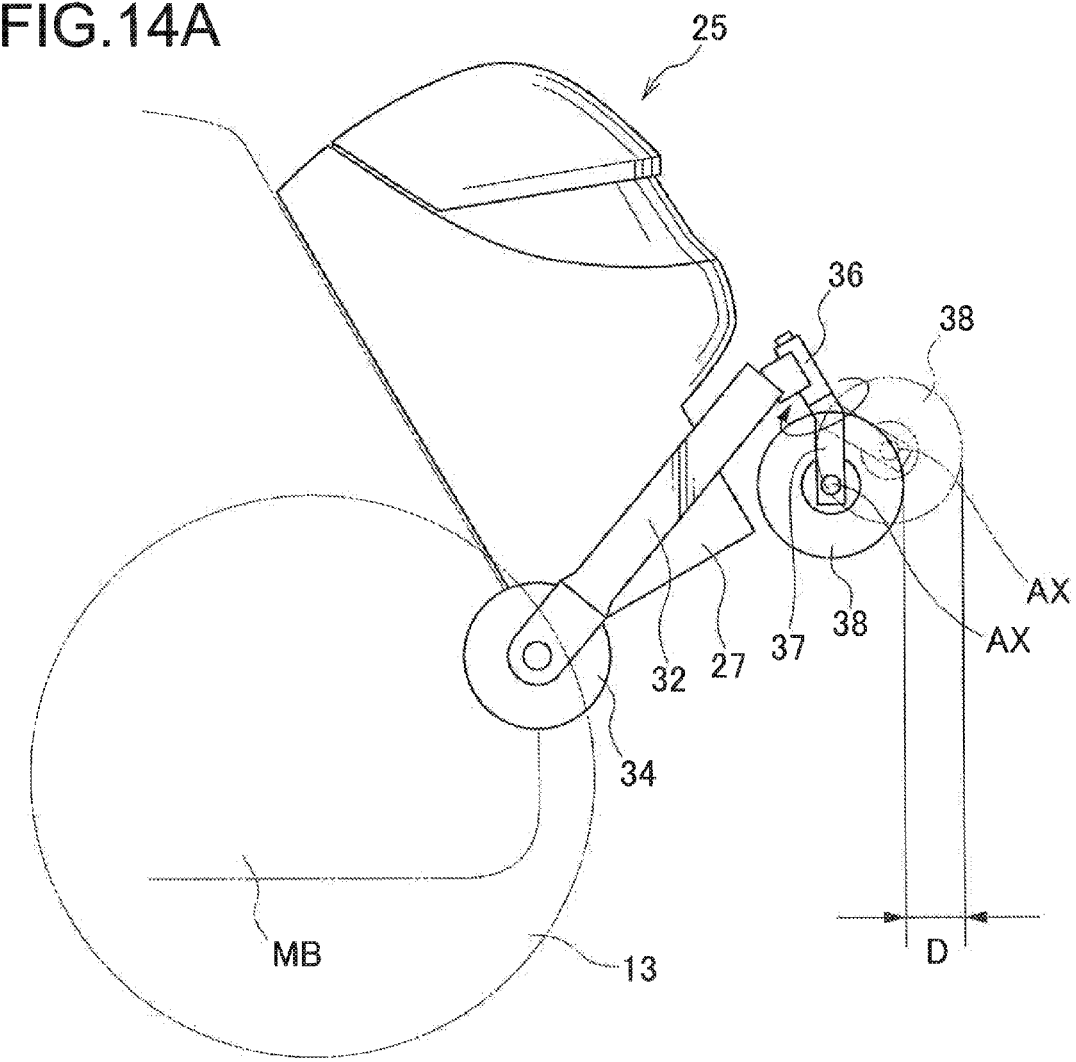
FIG. 14A is a diagram illustrating an aspect that the rear wheels of the battery case turn.
Figure 14B:
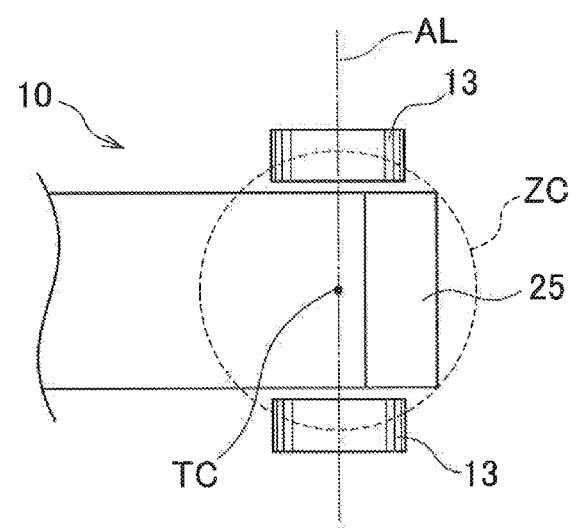
FIG. 14B is a diagram illustrating an aspect that the electric lawn mower is subjected to zero-turn.

Furthermore, in the process during which the battery car 25 is attached to the machine body, as illustrated in FIG. 14A, the rear wheels 38 turn in the direction of the arrow around the center line of the cylindrical portion 36, and a support axis AX of the rear wheels 38 moves forward. This is because the battery car 25 is attached to the rear portion of the electric lawn mower 10 while being obliquely inclined forward, and thus the rear wheels 38 of the battery car 25 turn by its own weight. The rear wheels 38 turn forward, and thus, the total length of the electric lawn mower 10 is shortened by a distance D. This is due to the fact that the axis of rotation (rotation center) of the rear wheels 38 is provided to deviate with respect to the turning center line of the rear wheel bracket 37 (the center line of the cylindrical portion 36). Therefore, it is possible to shorten the overall length of the electric lawn mower 10 as compared to the electric lawn mower when the rear wheel 38 does not turn about the cylindrical portion 36. Moreover, at this time, as illustrated in FIG. 14B, the battery car 25 including the rear wheels 38 is located in a turning circle ZC when the electric lawn mower 10 is subjected to zero-turn (non-running turning) around the center of the turning of a middle point TC of a line AL that connects the rotation center of the rear tires 13, 13. Therefore, at the time of zero-turn due to the rear tires 13, the battery car 25 does not project to the outside of the turning circle ZC, and it is possible to prevent the battery car 25 from being damaged or breaking down by hitting an obstacle.

Note that in the case of configuring the rear wheels 38 of the battery car 25 so as to project rearward from the battery case 27 in a state in which the electric lawn mower 10 is equipped with the battery car 25, when the electric lawn mower 10 reverses and encounters an obstacle, the rear wheels 38 come into contact with the obstacle, and it is possible to protect the battery case 27 from the obstacle.

Figure 15A:
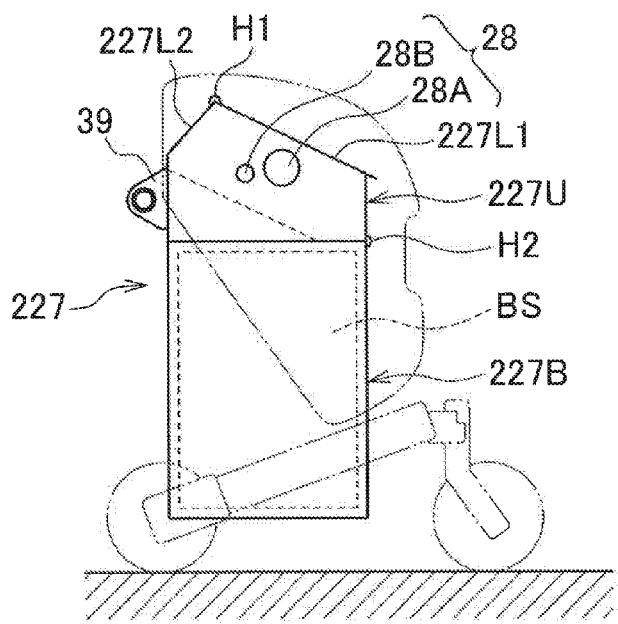
FIG. 15A is a side view of the battery case.
Figure 15B:
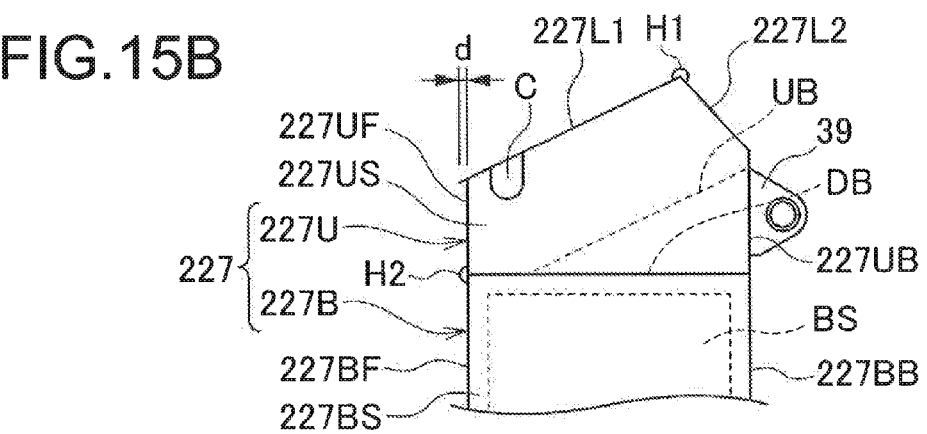
FIG. 15B is a partially enlarged side view thereof.
Figure 15C:
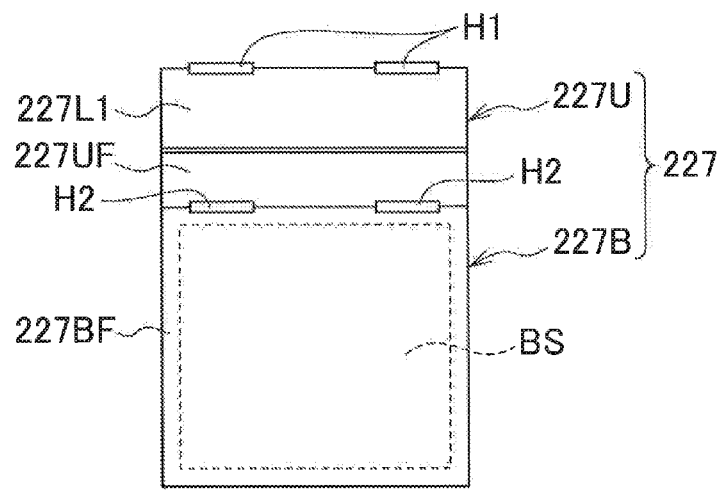
FIG. 15C is a front view thereof.
Figure 16A:
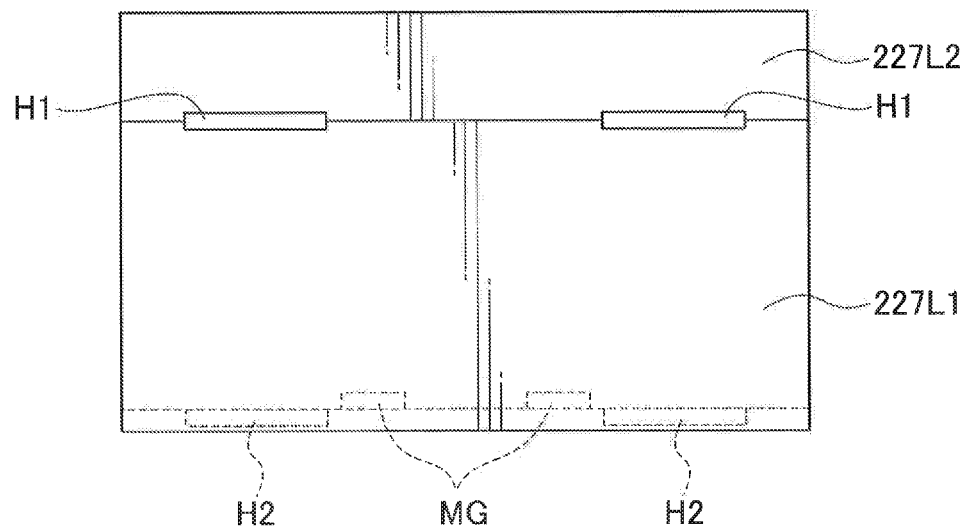
FIG. 16A is a plan view of the battery case.
Figure 16B:
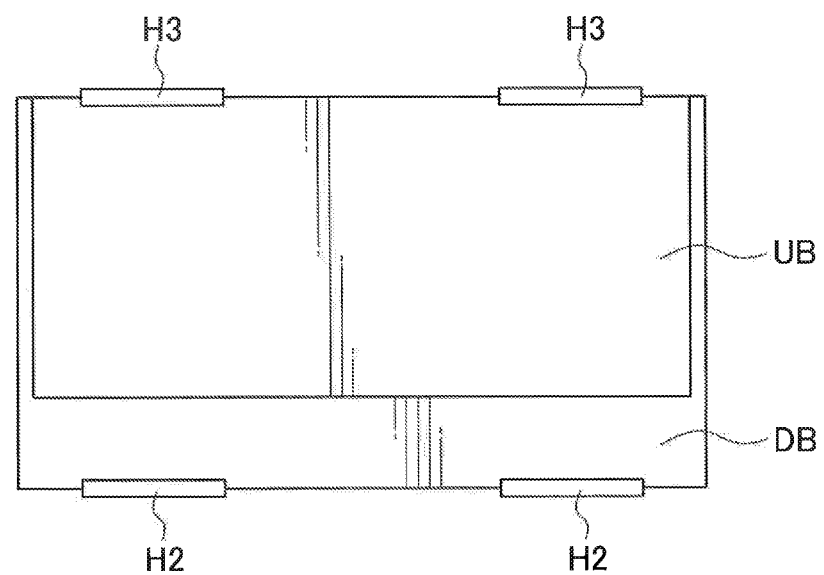
FIG. 16B is a plan view of the interior of the upper chamber thereof.

FIGS. 15 and 16 illustrate a battery case 227 as another example of the battery case 27. Configuration and operation other than the battery case 227 is the same as the previous example. The battery case 227 is formed in a substantially box shape by a metal plate, and includes an upper chamber 227U, and a lower chamber 227B. The upper chamber 227U and the lower chamber 227B are rotatably connected via a hinge H2. The upper chamber 227U includes a pair of side plates 227US, a front plate 227UF, a rear plate 227UB, a bottom plate DB, and top plates 227L1, 227L2. On the inner surface surrounded by these members, the upper plate UB is rotatably connected to the rear plate 227UB via a hinge H3.

When the battery car 25 is disposed on the electric lawn mower 10, considering that the upper plate UB is substantially horizontal, the upper plate UB is disposed within the upper chamber 227U. This is due to the fact that, as will be described later, a relay (reference numeral 82 in FIG. 17) disposed on the upper plate UB is required to be functionally horizontal. For this reason, in FIG. 15B, the upper plate UB is obliquely disposed with a certain angle relative to the bottom plate DB.

The left sideplate 227US is formed with two through holes to attach a rapid charging port 28A and a normal charging port 28B (the charging port 28 is constituted by the rapid charging port 28A and the normal charging port 28B). On the other hand, the left side plate 227US is provided with a notch C. A harness which will be described below is disposed on the notch C. A top plate 227L1 and a top plate 227L2 are connected to each other via a hinge H1. Note that a permanent magnet MG is attached to the inner side of the upper end of the front plate 227UF, and when the top plate 227L1 is closed, the top plate is attracted by the permanent magnet MG. For this reason, if constant force is not applied, the top plate does not rotate, and a locking mechanism functions. In addition, in a side view, the leading end of the top plate 227L1 is provided to slightly protrude from the front plate 227UF.

The lower chamber 227B includes a pair of side plates 227BS, a front plate 227BF, a rear plate 227BB, and a bottom plate. Note that an upper opening of the lower chamber 227B is covered by the bottom plate DB of the upper chamber 227U. In other words, the bottom plate DB of the upper chamber 227U also functions an upper surface of the lower chamber 227B. Accordingly, the dimension of the bottom plate DB and the dimension of the upper opening of the lower chamber 227B are substantially the same. In the lower chamber 227B, a plurality of battery cells are placed so as to be stacked. The stacked battery cells are bundled by the stainless steel band to constitute a battery module. In this example, three rows of the battery modules are housed in the lower chamber 227B. The battery modules are collectively referred to as a battery BS. Note that each of the lottery modules is electrically connected, an anode terminal and a cathode terminal protrude from the foremost end and the rearmost end of the connection.

Note that the lower end of the front plate 227UF of the upper chamber 227U, and the upper end of the front plate 227BF of the lower chamber 227B are connected to each other via a hinge H2. Furthermore, the back 27X in FIG. 3 includes rear plates 227UB, and 227BB, and the side surface 27S in FIG. 3 includes side plates 227US, and 227BS.

Figure 17A:
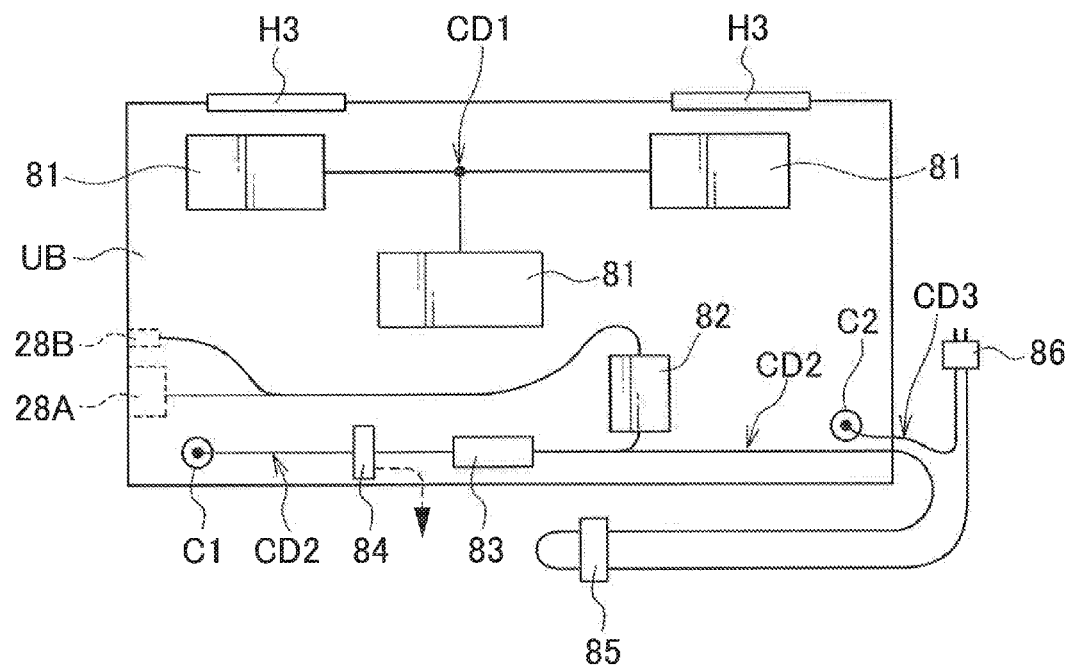
FIG. 17A is a diagram illustrating electrical components disposed on the upper plate.
Figure 17B:
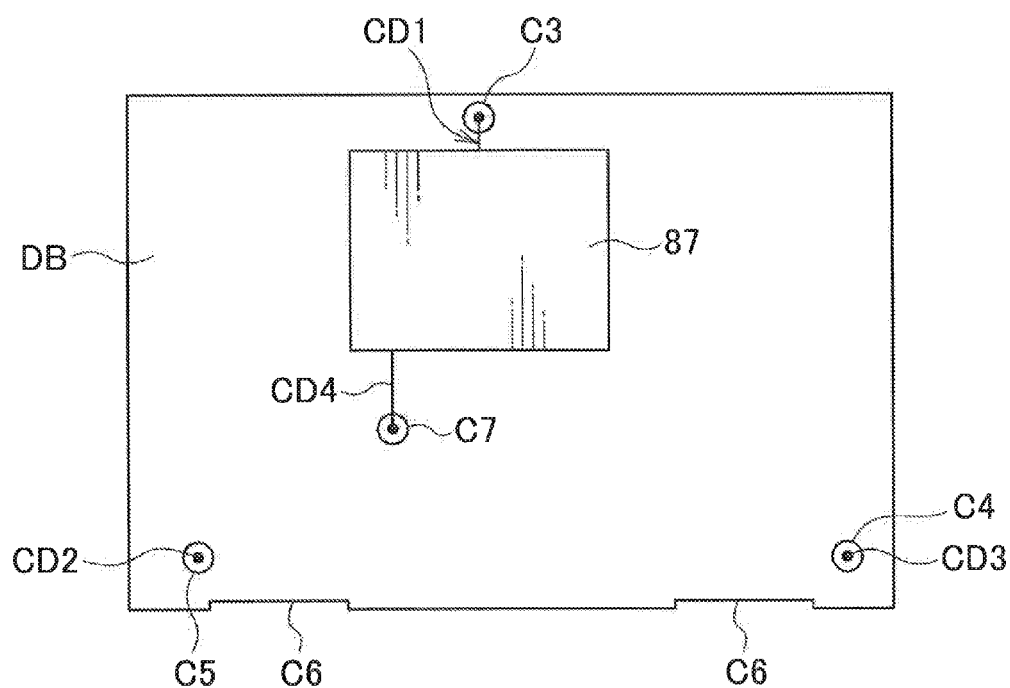
FIG. 17B is a diagram illustrating electrical components disposed on the lower plate.
Figure 18:
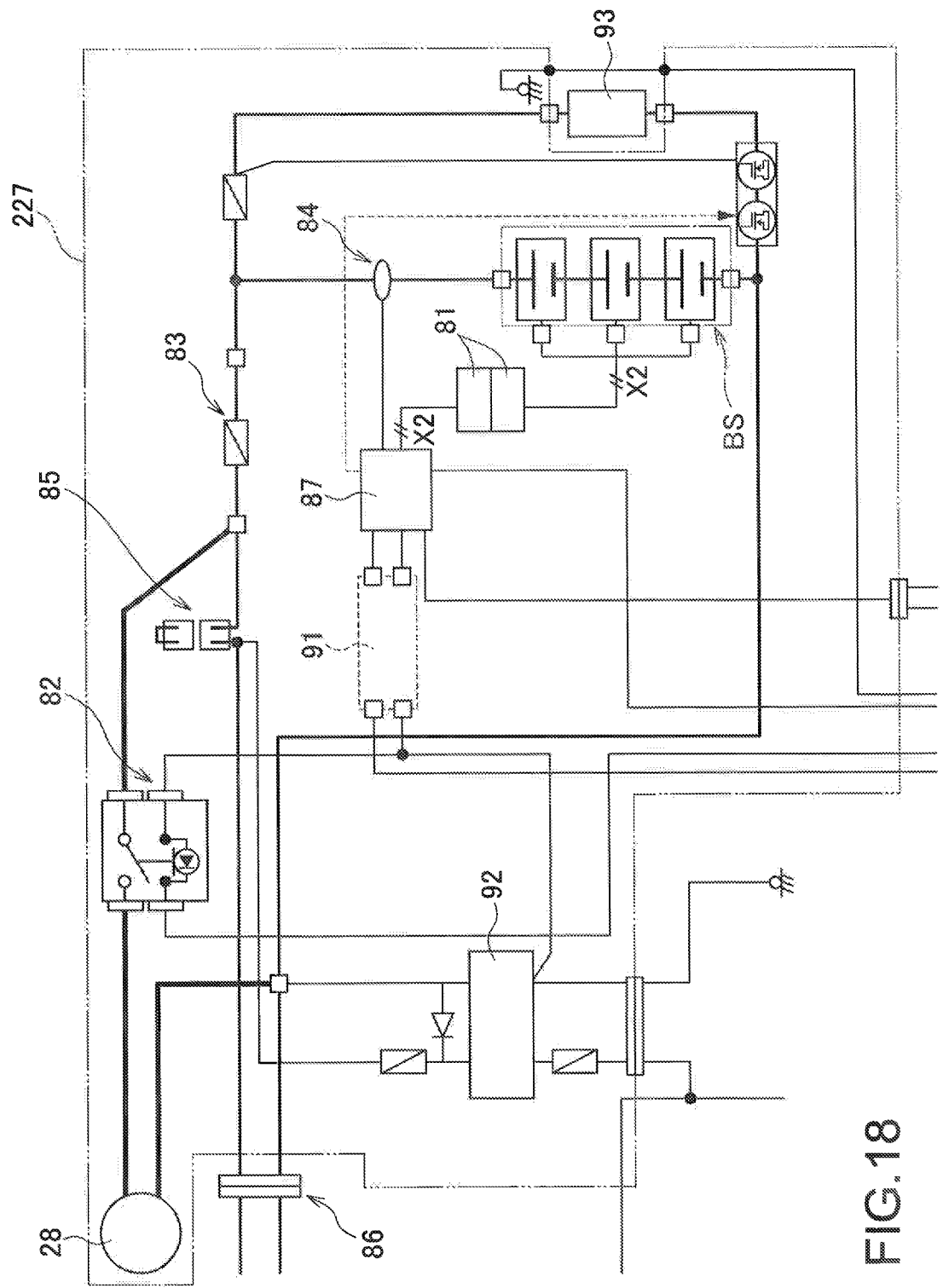
FIG. 18 is a circuit diagram of the electrical components in the battery case.

FIGS. 17A and 17B illustrate the details of the interior of the upper chamber 227U. On the upper plate UB, a control unit (BMU) 81 that controls the voltage value and the current value of the output of the battery BS, a relay 82, a large capacity fuse 83, a current sensor (a measurement unit) 84, a voltage sensor (not illustrated) (such as measurement unit) and the like are disposed (The details of the wiring are referred to FIG. 18. Note that reference numerals 91, and 92 in FIG. 18 illustrate DC-DC converters, and reference numeral 93 illustrates a charger. A heat sink is attached to the DC-DC converters 91, 92 to raise the heat dissipation effect).

Furthermore, in the notch C1, a cord CD2 is allowed to penetrate to the bottom plate DB side, and in the notch C2, a cord CD3 is allowed to penetrate from the bottom plate DB side. Note that one of the cords CD2 in two directions disposed on the cathode side of the relay 82 (the cord that does not pass through a current sensor 84) gets out of the battery case 27 from the notch C, and is connected to a connector 86 as an anode power supply via a safety plug 85. The cord CD3 as a cathode power supply is also connected to the connector 86. The connector 86 is connected to a harness placed in the rear portion of the machine body 11, and supplies electric power of the battery car 25 to the mower motor 15, the running motor 16 or the like (thus, when the battery car 25 is removed from the machine body 11, it is necessary to remove the connector 86 in advance).

The safety plug 85 is installed outside the battery case 227, and can be easily removed when it is necessary to forcibly block a power supply circuit in an emergency, during work or the like. Note that the information of the current value measured by the current sensor 84 is sent to a microcontroller (a control unit) 87 included in the lower plate DB via a cord (not illustrated).

The microcontroller 87 or the like is arranged on the lower plate DB. Furthermore, the lower plate DB is formed with notches C3, C4, C5, and C7. A cord CD4 for sending the information of the current value from the current sensor 84 to the microcontroller 87 is allowed to penetrate through the notch C7. Furthermore, a cord CD1 that connects the microcontroller 87 and the control unit 81 is allowed to penetrate through the notch C3. Furthermore, a cord CD2 connected to the anode terminal of the battery BS is allowed to penetrate through the notch C5. Furthermore, a cord CD3 connected to the cathode terminal of the battery BS is allowed to penetrate through the notch C4. Note that a notch C6 is a relief of the hinge H2.

Figure 19A:
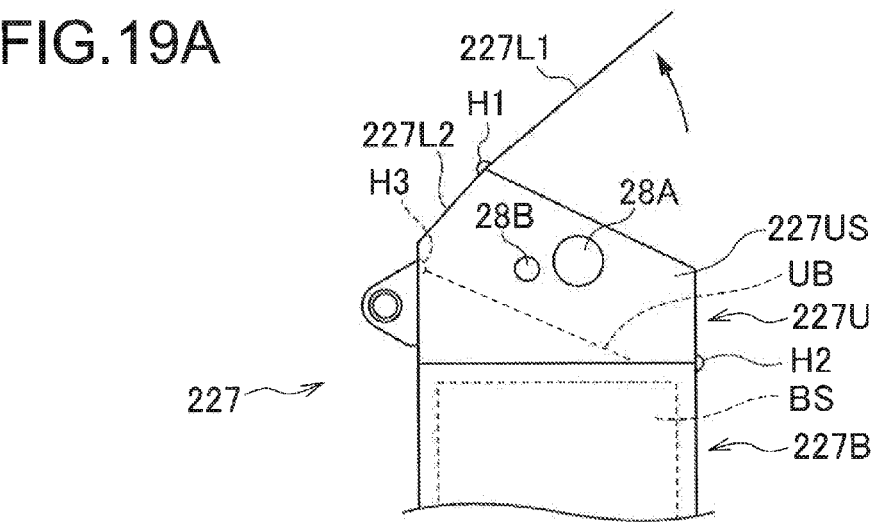
FIG. 19A is a diagram illustrating an aspect of opening the battery case when opening the top plate.
Figure 19B:
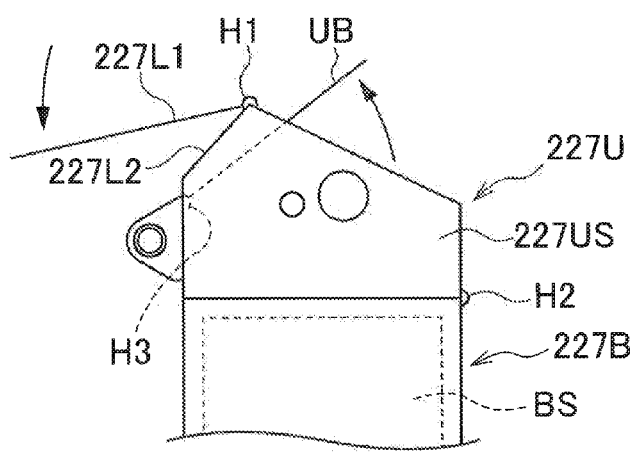
FIG. 19B is a diagram when rotating the top plate upward.

In the battery car 25 configured in this manner, in order to replace or maintain the electrical components, and the battery BS, first, the cover 26 is removed from the battery case 227 by loosening the bolts. As illustrated in FIG. 19A, the battery case 227 is able to open the top plate 227L1 around the hinge H1. By opening the top plate 227L1, it is possible to perform maintenance or the like of the electrical components such as the control unit (BMU) 81, the relay 82, the large capacity fuse 83, and the current sensor (measurement unit) 84 disposed on the upper plate UB. Furthermore, as illustrated in FIG. 19B, the upper plate UB can be opened around the hinge H3. By opening the upper plate DB, it is possible to perform the maintenance of the electrical components such as the microcontroller 87 disposed on the bottom plate DB. Note that when the upper plate UB is not rotated, the leading end of the upper plate UB comes into contact with the bottom plate DB.

Figure 19C:
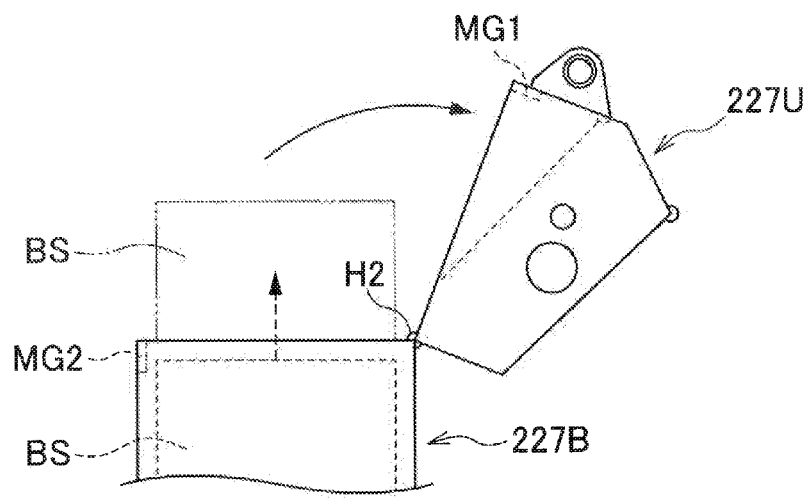
FIG. 19C is a diagram when opening the upper chamber.

As illustrated in FIG. 19C, the upper chamber 227U can be opened around the hinge H2. By opening the upper chamber 227U, it is possible to open the upper portion of the lower chamber 227B, and to take out the battery BS from the upper part of the lower chamber 227B. Note that permanent magnets MG1, MG2 are each included on the inner surface side of the front plate 227UF of the upper chamber 227U, and the inner surface of the upper end of the front plate 227BF of the lower chamber 227B, such that when closing the upper chamber 227U, both permanent magnets are adsorbed. For this reason, when constant force is not applied, the upper chamber 227U does not rotate, and the locking mechanism functions. Note that the locking mechanism is not limited to a configuration using the permanent magnets, and as long as it is possible to prevent the upper chamber 227U from being opened by inadvertently rotating due to vibration or the like, while the electric lawnmower 10 runs, any configuration may be adopted.

Figure 20A:
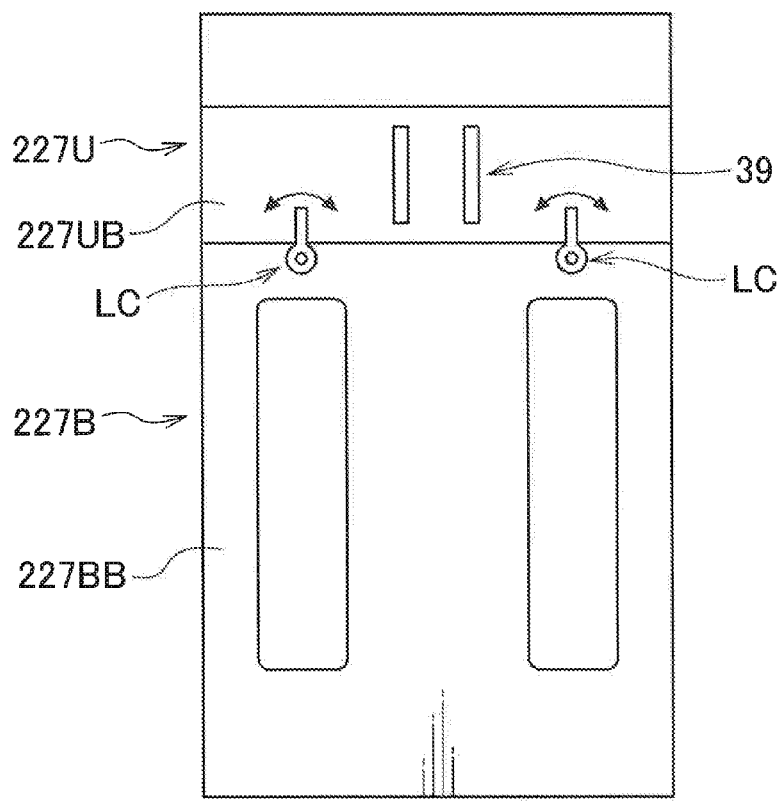
FIG. 20A is a rear view illustrating a modified example of the battery case.
Figure 20B:
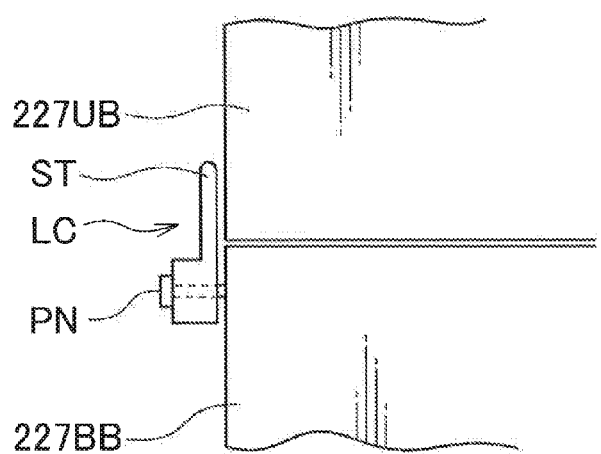
FIG. 20B is an enlarged view of the main portion thereof.

As an example, as illustrated in FIGS. 20A and 20B, the locking mechanism LC may be constituted by the latching portion ST and the pin PN. The latching portion ST is rotatable about the pin PN, and the pin PN is fixed to the rear plate 227BB of the lower chamber 227B. Thereby, the rotation of the upper chamber 227U is restricted, and it is possible to rotate the upper chamber 227U by releasing the lock only when necessary. When the lock is released, the leading end of the latching portion ST is rotated by approximately 180°, and is moved to the lower chamber 227B side. That is, when the upper chamber 227U is rotated, the latching portion ST is rotated up to a position where the rear plate 227UB does not come into contact with the latching portion ST. The latching portion ST is configured to rotate only when a force is applied by hands or the like. In such a way, it is possible to prevent the latching portion ST from rotating due to vibration or the like, and the upper chamber 227U from being inadvertently opened while the electric lawn mower 10 runs.

Figure 21A:
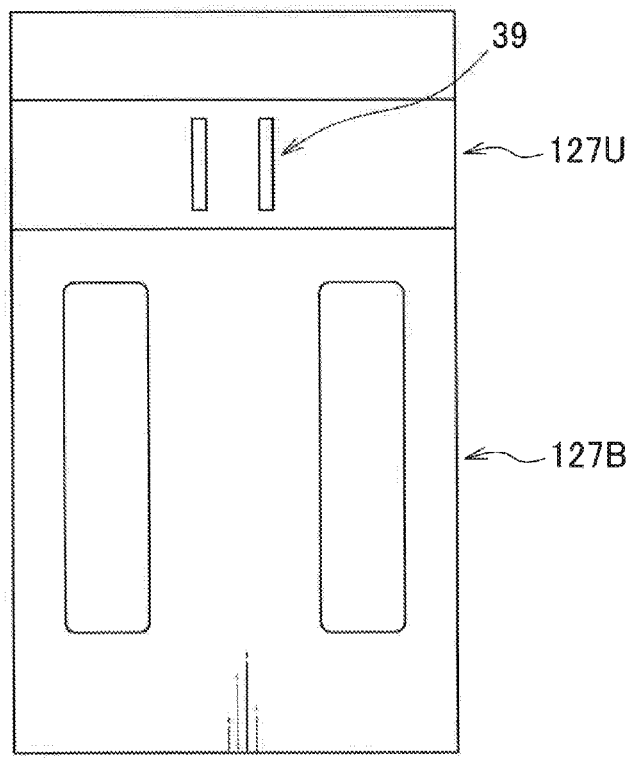
FIG. 21A is a rear view illustrating another example of the battery case.
Figure 21B:
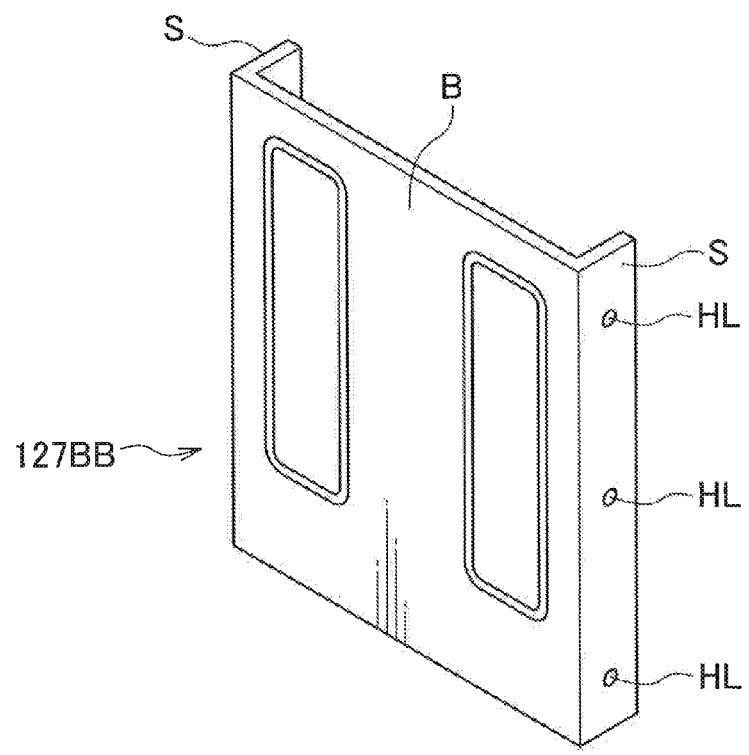
FIG. 21B is a perspective view of the rear plate of the lower chamber.
Figure 22:
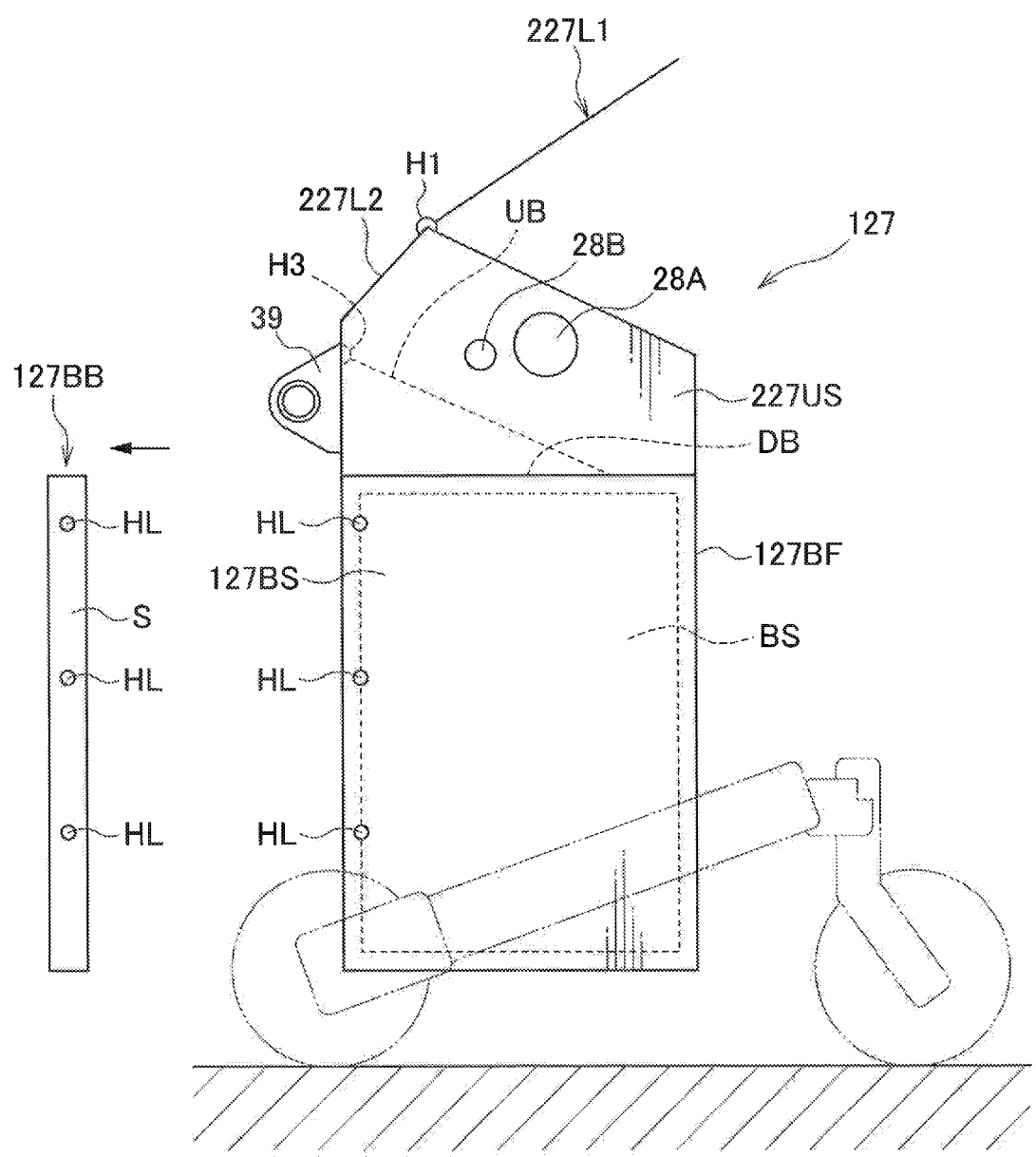
FIG. 22 is a diagram illustrating a procedure for taking out the battery by removing the rear plate of the lower chamber.

FIGS. 21 and 22 illustrate modified examples of the configuration of the battery case 227. These examples are the same as the previous example except that the configuration and the operation of the battery case 127 are different. Furthermore, the configuration of the battery case 127 is the same as that of the battery case 227 other than portions described below.

The battery case 127 includes an upper chamber 127U, and a lower chamber 127B. The upper chamber 127U and the lower chamber 127B are integrally formed. The upper chamber 127U includes a pair of side plates 227US, a front plate 227UF, a rear plate 227UB, a bottom plate DB, and top plates 227L1, 227L2. On the inner side surrounded by these members, the upper plate UB is rotatably connected to the rear plate via a hinge H3.

The lower chamber 127B includes a pair of side plates 127BS, a front plate 127BF, a rear plate 127BB, and a bottom plate. Note that the upper plate of the lower chamber 127B is shared by the bottom plate DB of the upper chamber 127U. The battery BS is disposed in the lower chamber 127B. An anode terminal and a cathode terminal project from the upper end of the battery BS.

A through hole HL is provided in the side plate 127BS. Furthermore, the rear plate 127BB (a side surface of the lower chamber) is configured so that a central portion B, and flange portions S and S extending on both side thereof are integrally formed. The through holes HL are provided in the left and right flange portions S, respectively. The lower chamber 127B is configured by fixing the rear plate 127BB to the side plate 127BS by bolts. That is, the through holes HL formed in each of the rear plate 127BB and the side plate 127BS are joined together and fastened by bolts. Therefore, the extraction work of the battery BS is different from the previous example in that the work is performed by removing the rear plate 127BB.

Figure 23A:
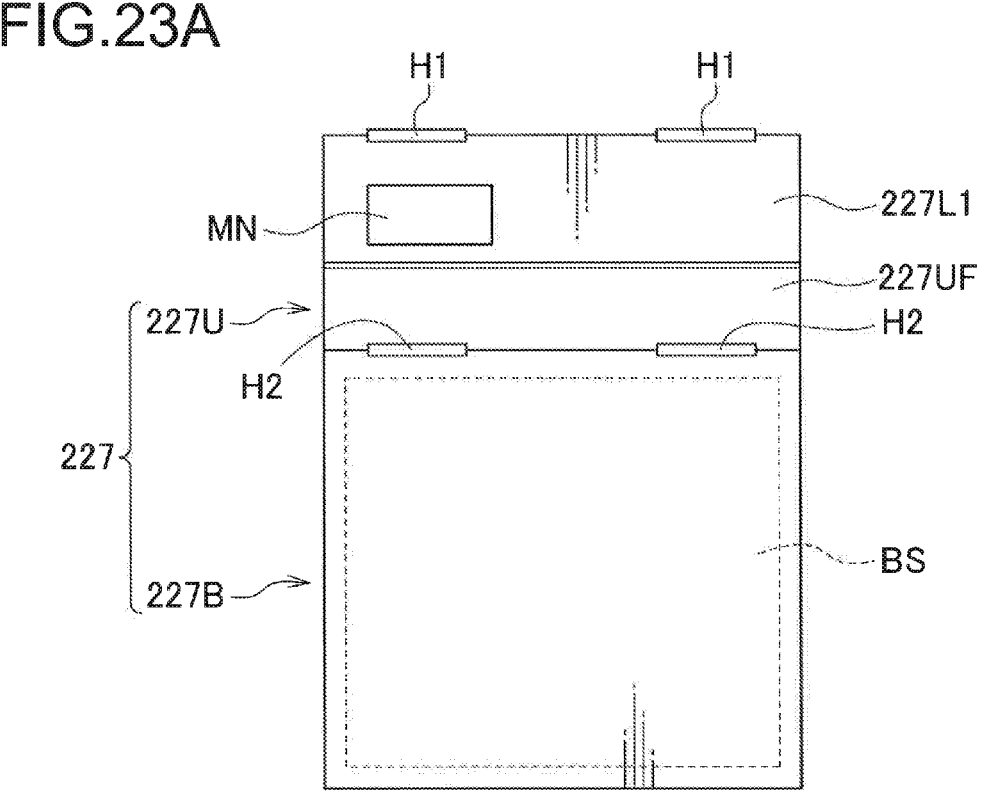
FIG. 23A is a diagram illustrating still another modified example of the battery case.
Figure 23B:
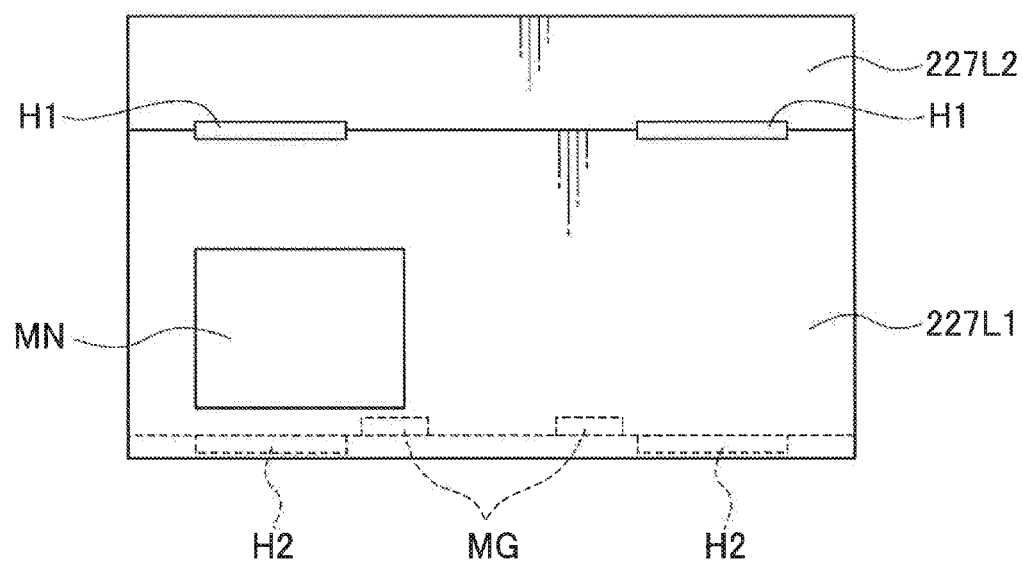
FIG. 23B is a plan view thereof.

Note that the battery case 227 illustrated in FIG. 15 may also be provided with a monitor. For example, as illustrated FIGS. 23A and 23B, the monitor is attached by forming a rectangular notch in the top plate 227L1, and fitting a liquid crystal monitor (display unit) MN in the notch. It is possible to display various pieces of information such as a voltage value, a current value, a battery residual quantity, and a temperature of the battery BS on the liquid crystal monitor MN. The liquid crystal monitor MN can be seen by opening the lid portion 26B of the cover 26 (there is no need to remove the cover 26).

Furthermore, the battery case 227 illustrated in FIG. 15 may be provided with an outlet for AC power supply. For example, as illustrated in FIGS. 24A and 24B, the outlet is attached by forming a rectangular notch in the top plate 227L1 of the upper chamber 227U, and fitting an outlet PP to the notch. The AC-DC converter 95 connected to the battery BS is connected to the outlet PP. The AC-DC converter 95 is intended to convert the DC power supply accumulated in the battery BS into the AC power supply (100V). The AC-DC converter 95 is attached to the surface of the front plate 227BF of the lower chamber 227B in the bracket BR. The outlet PP can be seen by opening the lid portion 26B of the cover 26 (there is no need to remove the cover 26).

By providing the outlet PP, the battery car 25 can be used in applications other than the electric lawn mower 10. For example, when the battery car 25 is removed and moved from the electric lawn mower 10 to perform nighttime work outdoors without illumination, the outlet PP may be used as a power supply of the illumination. Since the outlet PP is an AC power supply, it is possible to use a commercially available lightening apparatus.

Note that the battery car 25 was configured so that the charging port 28 is disposed on the left side in the above example, but the invention is not limited thereto, the charging port may be disposed on the right side, and may be disposed in the rear portion of the battery car 25.

Figure 25:
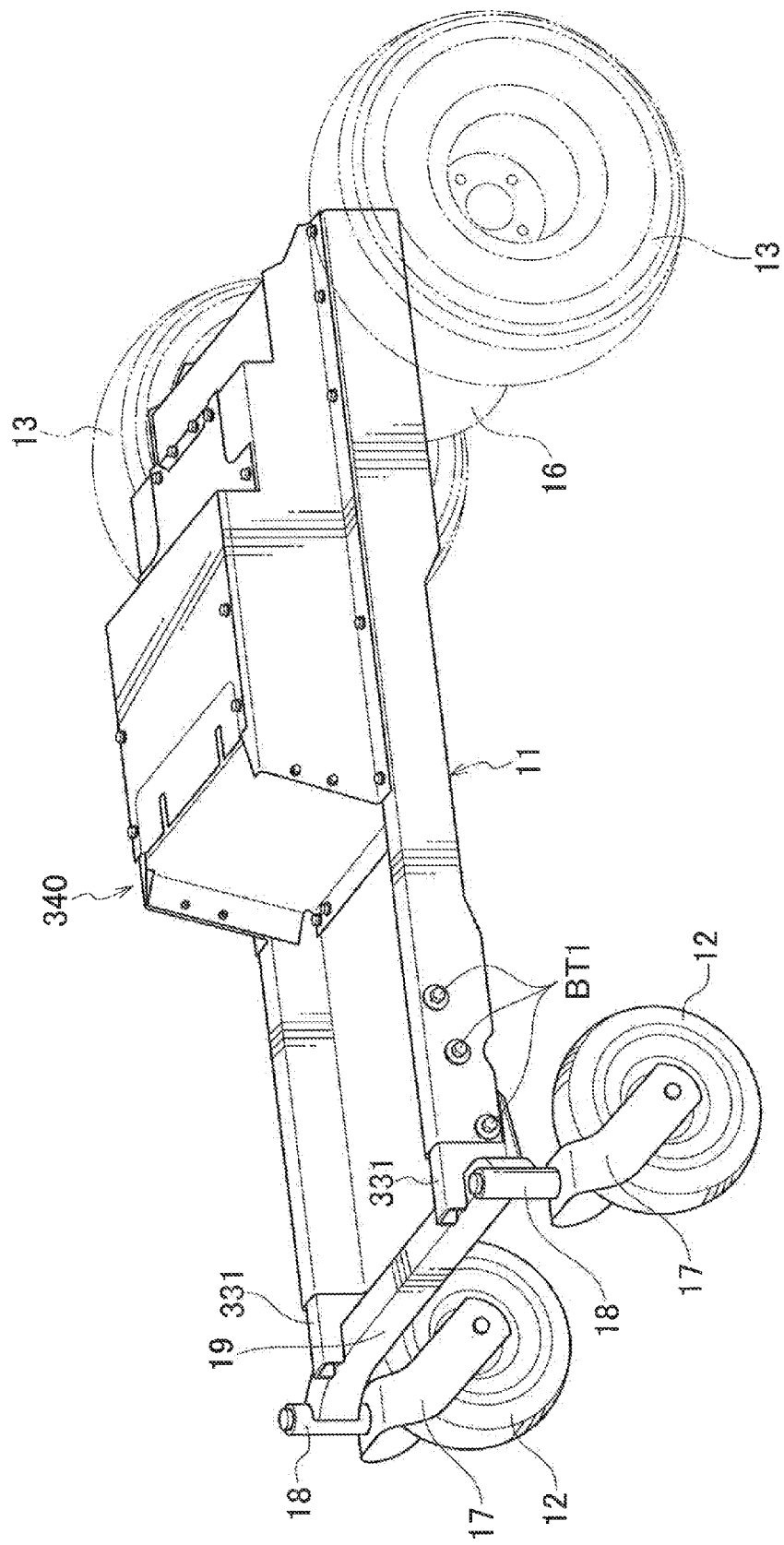
FIG. 25 is a schematic perspective view of the machine body.

FIG. 25 illustrates a perspective view of another example of a machine body of the electric lawn mower 10 illustrated in FIGS. 1 and 2. The configuration and the operation other than those described below are similar to the example illustrated in FIGS. 1 to 14. A driver's seat support frame 340 for mounting the driver's seat 21 is attached onto the chassis 11. The electrical components such as the mower motor driver, and the running motor driver are housed within the driver's seat support frame 340. The running motors 16, 16 are attached to the vicinity of the rear end of the chassis 11, and the rear tires 13 are attached to the running motors 16 via a transmission case, respectively.

The brackets 331, 331 are fixed to the left and right front ends of the chassis 11 by bolts BT1. The leading ends of the brackets 331 are connected to the front frame 19 by welding or the like.

Figure 26:
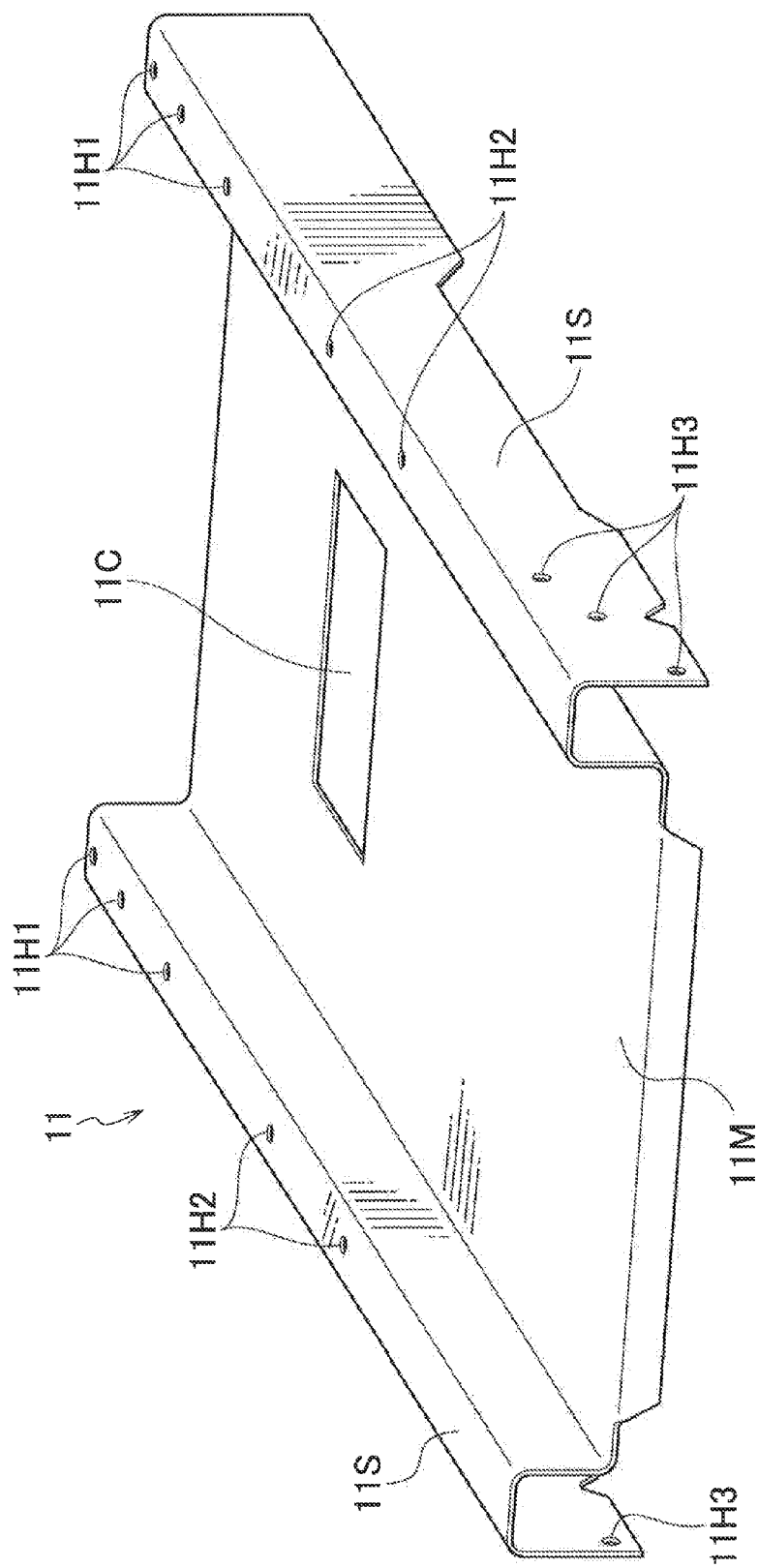
FIG. 26 is a perspective view of a chassis.

The chassis 11 is formed by processing a metal plate, as illustrated in FIG. 26, and both side portions 11S, 11S, and a central portion 11M disposed therebetween are integrally formed. A notch 11C is formed in the rear portion of the central portion 11M. The notch 11C is intended to project the radiator panel included in the mower motor driver toward the lower side. On the upper surface of each of the side portions 11S, three through holes 11H1, and two through holes 11H2 are provided. In addition, three through holes 11H3 are provided on the outer surface of each of the side portions 11S. Furthermore, the through holes 11H3 are intended to be joined with the through holes formed in the bracket 331 and be fixed by the bolts BT1.

The cross-section of the side portion 11S is formed in a substantially gate shape. For this reason, it is possible to reduce the weight of the structure of the side portion of the chassis 11. Furthermore, it is possible to arrange a cable to be described later along a hollow portion of the side portion 11S.

Figure 27:
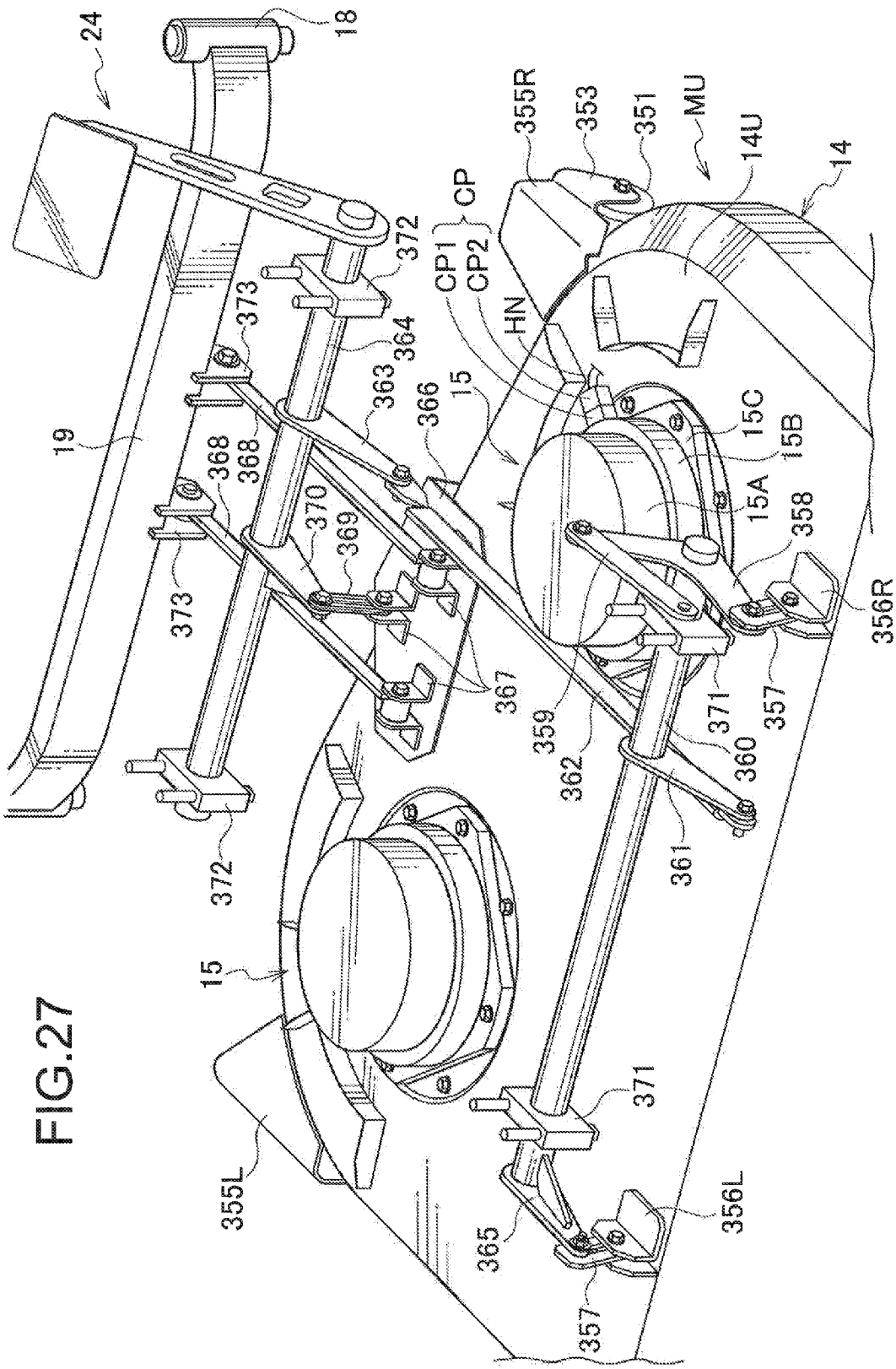
FIG. 27 is a perspective view of the vicinity of a mower deck.
Figure 28:
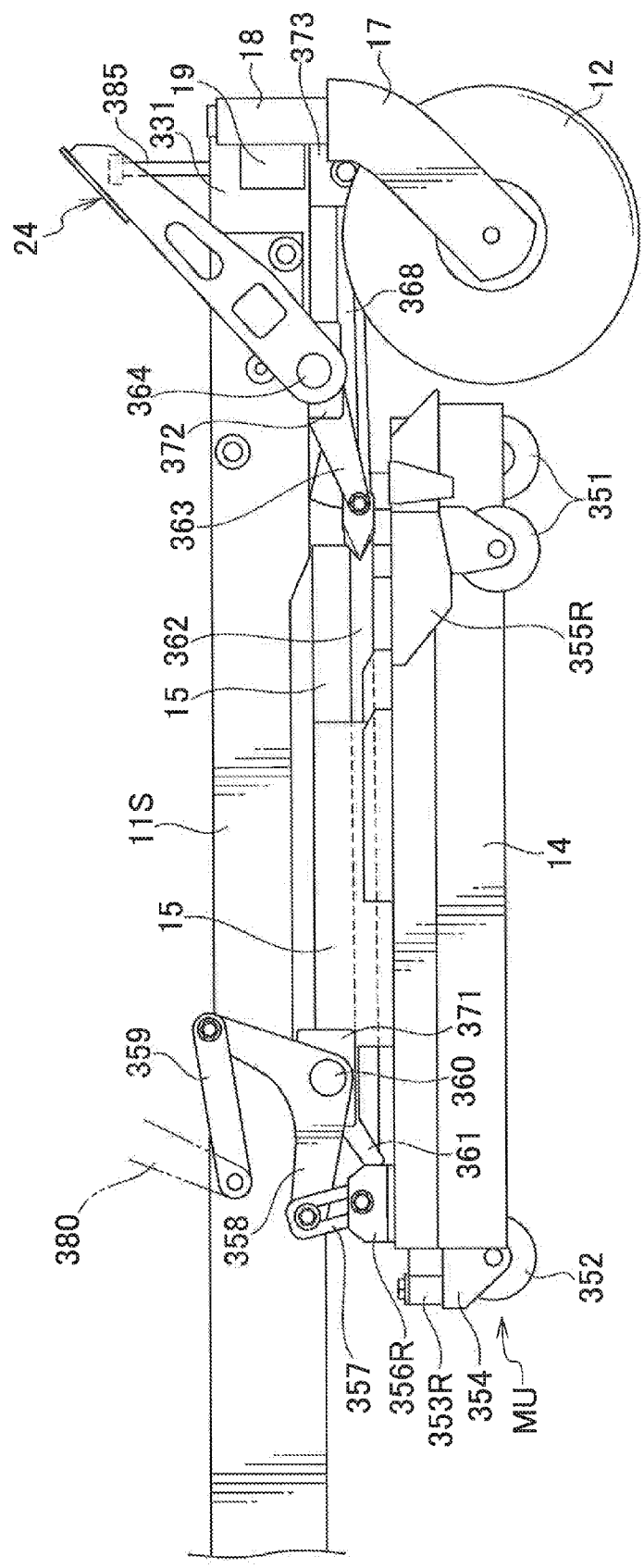
FIG. 28 is a right side view of the main portion.
Figure 29:
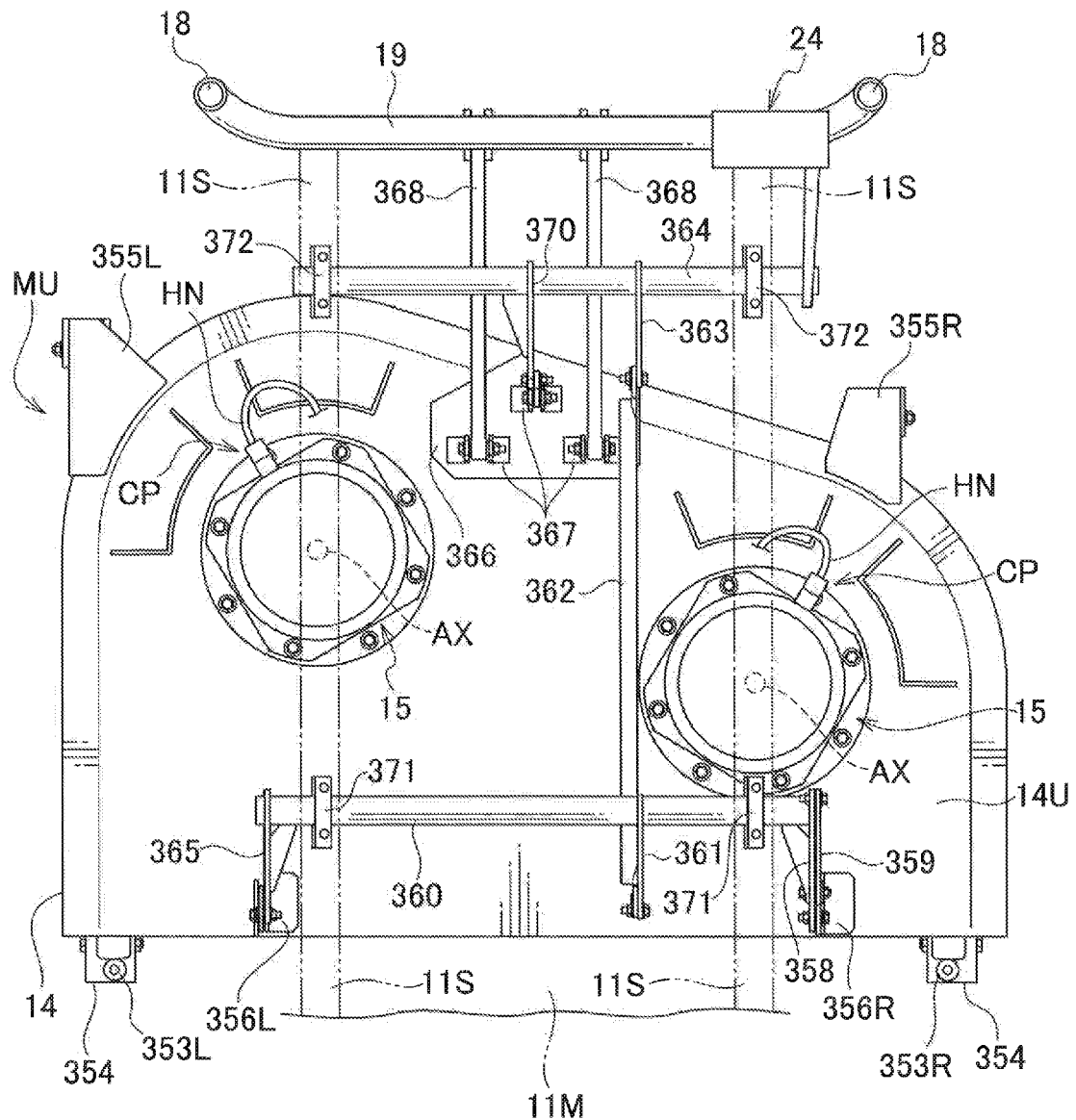
FIG. 29 is a plan view of the vicinity of the mower deck.

FIGS. 27 to 29 illustrate the details of the mower deck unit MU and a link mechanism for suspending the same. The mower deck unit MU includes a mower deck 14, two mower motors 15, 15, mower blades fixed to the leading end of the rotational axis AX of the mower motors 15 and the like. The mower motors 15 arrange an upper portion 15A, a lower portion 15B, and a bracket 15C in this order. The mower motors 15 are fixed to the upper surface 14U of the mower deck 14 by allowing the bolts to penetrate through the bracket 15C.

A coupler CP1 protrudes from the side surface of the lower portion 15B of the mower motor 15. A cable HN is attached to a coupler CP2 connected to the coupler CP1. Note that the coupler CP1 and the coupler CP2 are collectively referred to as a connecting portion CP. Note that since the mower deck 14 is raised and lowered with respect to the chassis 11 via a link mechanism, the cable HN is arranged to have a margin of length between the side portions 11S of the chassis 11 and the coupler CP2.

Brackets 355R and 355L are each fixed to the front side left and right ends of the mower deck 14, and a tire bracket 353 is fixed to the brackets 355R and the 355L. Moreover, gauge wheels 351, 351 are attached to the tire bracket 353 in a freely rotatable manner. The brackets 353R and 353L are each fixed to the rear side left and right ends of the mower deck 14, and tire brackets 354, 354 are attached to each of the brackets 353R and 353L in a freely turnable manner. Moreover, a gauge wheel 352 is attached to the tire bracket 354 in a freely rotatable manner.

On the upper surface 14U substantially at the center of the front end of the mower deck 14, an attaching plate 366 is fixed by bolts or the like, and three support brackets 367 are fixed to the attaching plates 366 by bolts or the like. One end of a long plate-like link bar 368 is rotatably attached to two of the support brackets 367 by bolts or the like. The other end of the link bar 368 is rotatably attached to the bracket 373 by bolts. Note that the bracket 373 is fixed to the front frame 19 by welding or the like. Meanwhile, a link portion 369 is rotatably attached to the remaining one support bracket 367 by bolts or the like. A long hole is formed in the link portion 369, and the bolt is disposed in the long hole so as to be loosely fitted. The bolt is fixed to one end of the link member 370. The other end of the link member 370 is fixed to an intermediate portion of a rotating rod 364. A right end of the rotating rod 364 is fixed to a height adjustment pedal 24. Supporting members 372, 372 are rotatably attached to the position separated inward from both ends of the rotating rod 364 by a predetermined distance. The support members 372 are attached to the side portions 11S of the chassis 11 from below. Thus, the rotating rod 364 is attached to the chassis 11 in a freely rotatable manner.

One end of another link member 363 is also fixed to the intermediate portion of the rotating rod 364 (a major axis direction of the link member 363, that is, a center line direction is arranged so as to fall down toward the rear side than a horizontal line). The other end of the link member 363 is rotatably attached to one end of the long plate-like link bar 362 via the bolt. The other end of the link bar 362 is rotatably attached to one end of the link member 361 via the bolt (a major axis direction of the link member 361, that is, a center line direction is arranged so as to fall down toward the rear side than the horizontal line). The other end of the link member 361 is fixed to the intermediate portion of a rotating rod 360. The intermediate portion of the plate-like link member 358 is fixed to the right end of the rotating rod 360. The link member 358 is formed in a boomerang shape, and one end of another link member 359 is rotatably attached to the upper end thereof via a bolt. The other end of the link member 359 is rotatably attached to a lifting link plate 380 to be described below via bolts.

Meanwhile, the lower end of the link member 358 is attached to the link portion 357 via a bolt. A long hole is formed in the link portion 357, and the bolt is loosely fitted into the long hole. Thus, the link member 358 is vertically movable within the link portion 357 via a bolt. The lower end of the link portion 357 is rotatably attached to the bracket 356R by a bolt. Note that the brackets 356R and 356L are attached to the left and right of the rear end of the upper surface 14U of the mower deck 14 by bolts.

One end of the link portion 357 is rotatably attached to the bracket 356L by means of a bolt. A long hole is formed in the link portion 357, and one end of the link member 365 is attached so as to loosely fit the bolt to the long hole. The other end of the link member 365 is fixed to the left end of the rotating rod 360. Note that support member 371, 371 are rotatably attached to the position separated inward from the left and right end portions of the rotating rod 360 by a certain distance. The support member 371 are attached to the side portions 11S of the chassis 11 from below. Thus, the rotating rod 360 is rotatably attached to the chassis 11. Note that reference numeral 385 is a stopper that is configured so that when stepping on the height adjustment pedal 24, the upper end of the stopper 385 comes into contact with the back surface of the leading end portion of the height adjustment pedal 24, thereby restricting the height adjustment pedal 24 from being further stepped on.

Figure 30:
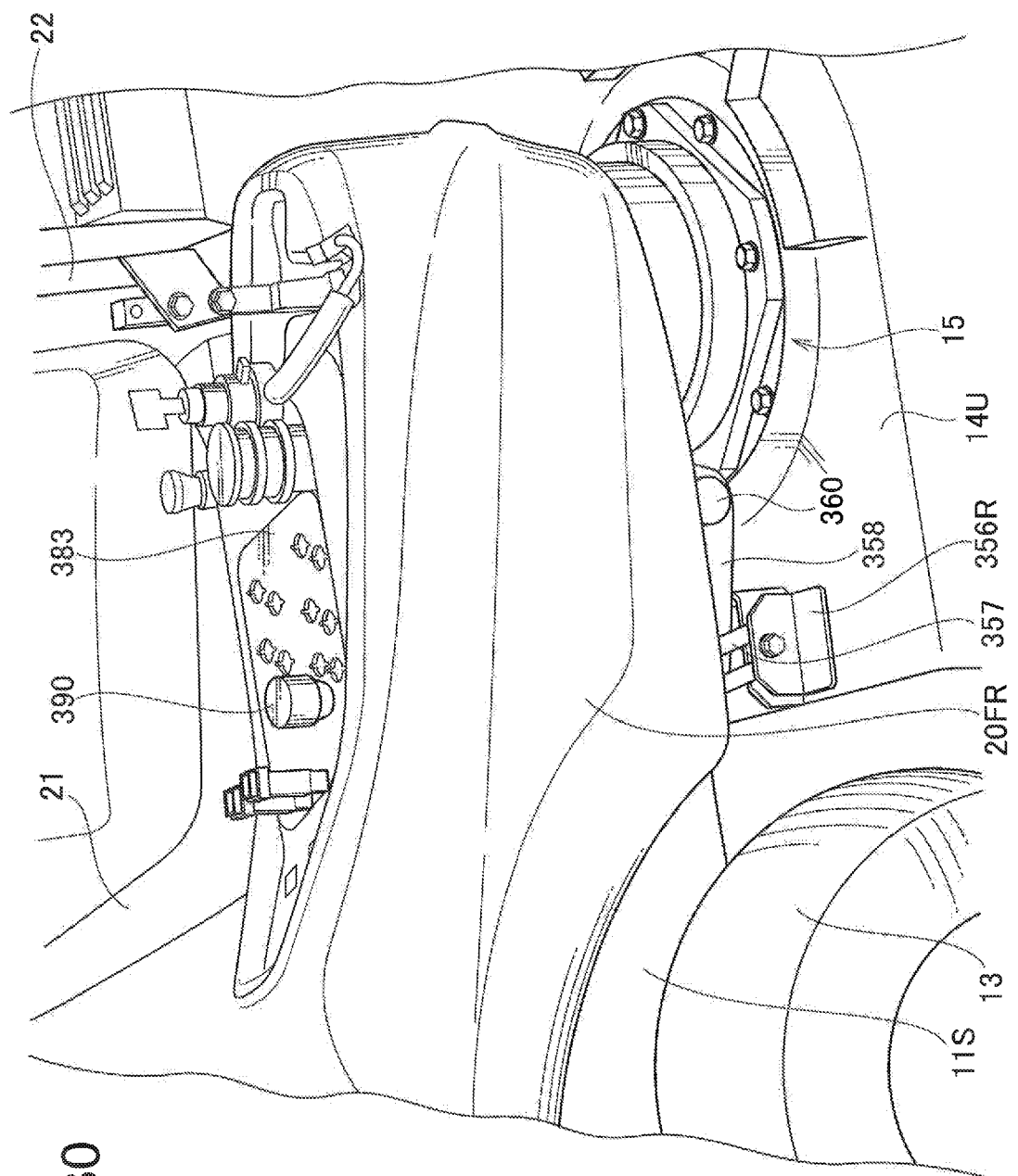
FIG. 30 is a diagram illustrating a height adjustment mechanism of the mower deck.

FIGS. 30 and 31 illustrate the details of the height adjustment mechanism for raising and lowering the mower deck unit MU. The other end of the link member 359 is connected to one end of the lifting link plate 380 via a bolt in a freely rotatable manner. The upper portion of the lifting link plate 380 is loosely fitted to a long hole 384L formed in the center of an adjustment plate 384, and a pipe-shaped locking portion 380T is fixed to the upper end of the lifting link plate 380 (the locking portion 380T is a stopper of the long hole 384L). Furthermore, the rotating shaft 381 is fixed to a substantially central portion of the lifting link plate 380 by penetrating therethrough. One end of the rotating shaft 381 is supported by the bracket 382 in a freely rotatable manner. Note that the other end of the rotating shaft 381 is also supported by a bracket (not illustrated) in a freely rotatable manner. This bracket and the brackets 382 are fixed to the side portions 11S of the chassis 11 by bolts (not illustrated).

The adjustment plate 384 is formed with a plurality of through holes 384H. The through holes 384H are formed in plural on both side surfaces of the long hole 384L with a regular interval. An adjustment plate 383 is included above the adjustment plate 384. The adjustment plate 383 is arranged in parallel to the adjustment plate 384, and is suitably attached to a fender 20FR. Furthermore, the adjustment plate 383 is formed with a plurality of through holes 383H. The through holes 383H are formed vertically above the position corresponding to the through holes 384H. A height adjustment pin 390 can be inserted into the through holes 383H and the through holes 384H. The height adjustment pin 390 is intended to be inserted to the through holes 383H and the through holes 384H to come into contact with the locking portion 380T of the lifting link plate 380, thereby stopping the movement of the lifting link plate 380 at a predetermined position. The through holes 384H, 383H are formed by two rows on each side of the long hole 384L in a plan view, which is to take the interval for stopping the locking portion 380T finely as possible.

The height adjustment pin 390 includes a head portion 390A, an intermediate portion 390B having a smaller radius than that, and a shaft portion 390C. A pair of protrusions 390CT, 390CT is formed on the upper outer periphery of the shaft portion 390C. The protrusions 390CT are formed at positions that are symmetrical by 180° in the radial direction of the shaft portion 390C. Note that the outer diameters of the through hole 383H and the through hole 384H are formed to be slightly larger than the outer diameter of the shaft portion 390C.

Furthermore, a pair of notches 383HB, 383HB is formed on the outer periphery of the through hole 383H. The notches 383HB are formed at intervals of 180° on the outer periphery of the through hole 383H. When the height adjustment pin 390 is inserted into the through hole 383H, the protrusions 390CT, 390CT are positioned so as to pass through the notches 383HB, 383HB. Thus, the protrusions 390CT are formed in the size enough to pass through the notches 383HB. Note that after the protrusions 390CT pass through the notches 383HB, the height adjustment pin 390 is prevented from drawing out of the through hole 383H, by rotating the height adjustment pin 390 by 90° along the center line 390L.

Next, a procedure of raising and lowering the mower deck unit MU in the electric lawn mower 10 configured in this manner will be described. Here, assuming that the mower deck unit MU is at the highest position of the mowing operation, a method of lowering the mower deck unit MU will be first described. First, the deck lifting pedal 24 is strongly stepped on by a right foot. Then, since the rotating rod 364 rotates forward, the link member 370 rotates upward. Thus, the front side of the mower deck 14 is lifted and rises. When the rotating rod 364 rotates forward, the link member 363 also rotates upward, and the link bar 362 is pushed rearward. The link bar 362 rotates the link member 361 upward, and the rotating rod 360 rotates upward. Thus, the link member 358 rotates forward, thereby lifting the rear side of the mower deck 14. Therefore, the mower deck unit MU rises in parallel front and back.

The link member 358 rotates forward, and thus the link member 359 moves forward. Accordingly, the lifting link plate 380 rotates rearward around the rotating shaft 381. Until the deck lifting pedal 24 comes into contact with the stopper 385, that is, until the mower deck unit MU becomes the height switching position, the deck lifting pedal 24 is stepped on. Moreover, the state of stepping on the deck lifting pedal 24 by the right foot is maintained.

By rotating the height adjustment pin 390 around the center line 390L in this state, the protrusion 390CT and the notch 383HB of the through hole 383H are joined together. Moreover, the height adjustment pin 390 is drawn out of the adjustment plates 383, 384, and is inserted into the through holes 383H, 384H of the desired position. Moreover, the height adjustment pin 390 is rotated around the center line 390L to prevent the drawing-out.

Next, when the link member 358 is rotated rearward (a driver's seat direction) so as to slightly loosen force of stepping on the deck lifting pedal 24, since the rotating rod 364 rotates rearward, the link member 370 rotates downward. Thus, the front side of the mower deck 14 descends by its own weight. When the rotating rod 364 rotates rearward, the link member 363 also rotates downward, and the link bar 362 is pulled forward. The link bar 362 rotates the link member 361 downward, and the rotating rod 360 rotates downward. Thus, the link member 358 rotates rearward, thereby lowering the rear side of the mower deck 14 by its own weight. Therefore, the mower deck unit MU descends in parallel front and back.

The link member 358 rotates rearward, and thus the link member 359 moves rearward. Accordingly, the lifting link plate 380 rotates forward around the rotating shaft 381. For this reason, the locking portion 380T moves forward along the long hole 384L, stops the movement thereof by coming into contact with the height adjustment pin 390, and finishes the height adjustment of the mower deck unit MU. Thereafter, a right foot is separated from the height adjustment pedal 24.

Next, a method of raising the mower deck unit MU will be described. First, the deck lifting pedal 24 is strongly stepped on by the right foot. Then, since the rotating rod 364 rotates forward, the link member 370 rotates upward. Thereby, the front side of the mower deck 14 is lifted and rises. When the rotating rod 364 rotates forward, the link member 363 also rotates upward, and the link bar 362 is pushed rearward. The link bar 362 rotates the link member 361 upward, and thus the rotating rod 360 rotates forward. Thus, the link member 358 rotates forward, thereby lifting the rear side of the mower deck 14. Therefore, the mower deck unit MU rises in parallel front and back.

The link member 358 rotates forward, and thus the link member 359 moves forward. Accordingly, the lifting link plate 380 rotates rearward around the rotating shaft 381. Until the deck lifting pedal 24 comes into contact with the stopper 385, that is, until the mower deck unit MU becomes the height switching position, the deck lifting pedal 24 is stepped on. Moreover, the state of stepping on the deck lifting pedal 24 by the right foot is maintained.

Next, by rotating the height adjustment pin 390 around the center line 390L, the protrusion 390CT and the notch 383HB of the through hole 383H are joined together. Moreover, the height adjustment pin 390 is drawn out of the adjustment plates 383, 384, and is inserted into the through holes 383H, 384H of the desired position. Moreover, the height adjustment pin 390 is rotated around the center line 390L to prevent the drawing-out thereof.

Furthermore, when the link member 358 is rotated rearward (the driver's seat direction) so as to slightly loosen the force of stepping on the deck lifting pedal 24, since the rotating rod 364 rotates rearward, the link member 370 rotates downward. Thus, the front side of the mower deck 14 descends by its own weight. When the rotating rod 364 rotates rearward, the link member 363 also rotates downward, and the link bar 362 is pulled forward. The link bar 362 rotates the link member 361 downward, and the rotating rod 360 rotates rearward. Thus, the link member 358 rotates rearward, thereby lowering the rear side of the mower deck 14 by its own weight. Therefore, the mower deck unit MU descends in parallel front and back.

The link member 358 rotates rearward, and thus the link member 359 moves rearward. Accordingly, the lifting link plate 380 rotates forward around the rotating shaft 381. For this reason, the locking portion 380T moves forward along the long hole 384L, stops the movement by coming into contact with the height adjustment pin 390, and finishes the height adjustment of the mower deck unit MU. Thereafter, the right foot is separated from the height adjustment pedal 24.

Figure 32A:
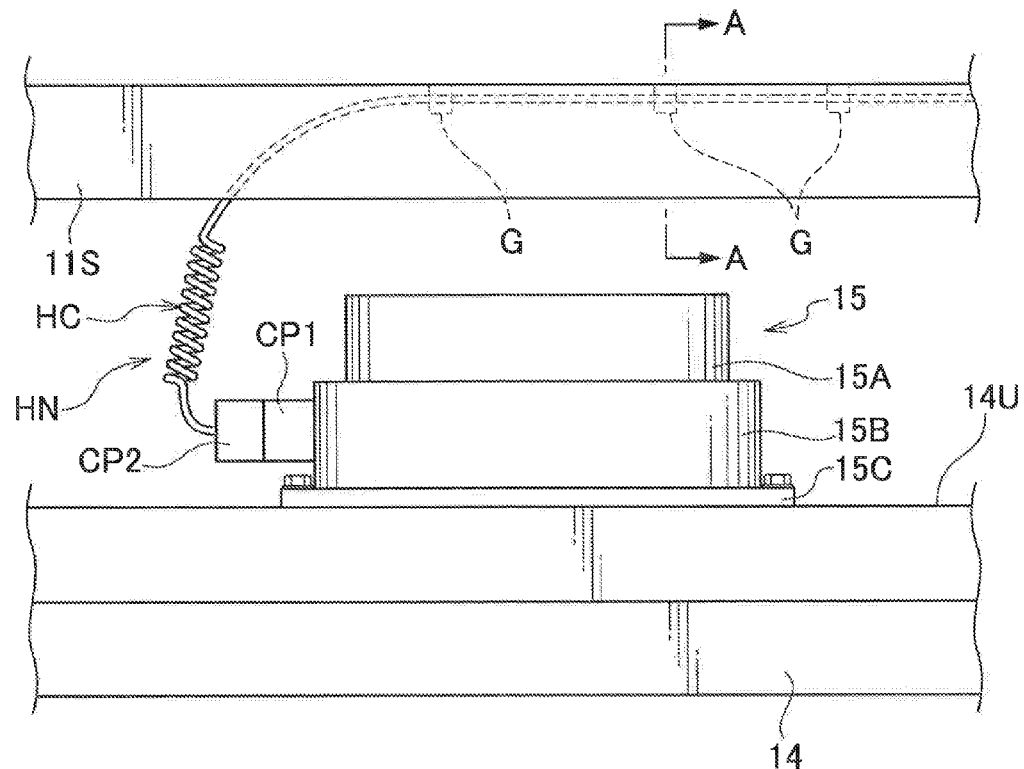
FIG. 32A is a side view of the vicinity of a mower motor.
Figure 32B:
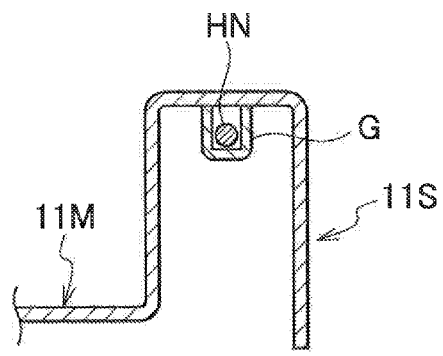
FIG. 32B is a cross-sectional view taken along line A of FIG. 32A.

FIGS. 32A and 32B illustrate the details of the electrical connection of the mower motor 15. The mower motor 15 is connected to a mower motor driver housed in the driver's seat support frame 340 via a coupler CP1 provided on a side surface of the lower portion 15B, a coupler CP2 coupled thereto, and a cable HN. The cable HN is disposed in the side portion 11S of the chassis 11, and extends into the driver's seat support frame 340. The cable is disposed in the side portion 11S so as to be suspended by being supported from below by the guide member G. The guide member G may be formed integrally with the side portion 11S, or may be configured to be separately formed and attached to the inside of the side portion 11S by bolts or the like. By disposing the cable HN within the side portion 11S, it is possible to prevent the cable HN from being damaged by impact from above. Furthermore, it is not necessary to separately receive a protection member for protecting by installing the cable HN.

The cable HN constitutes a coil-shaped coil portion HC in the vicinity of the coupler CP2. The cable HN is fixed in the side portion 11S by the guide member G, and can hardly expand and contract. For this reason, in the case in which the cable HN is configured to be freely attached to and detached from the mower motor 15, it is necessary to design the cable to have a slack in consideration of workability during attachment and detachment. However, by providing the coil portion HC, it is possible to minimize the slack in the cable HN of the portion exposed downward from the side portion 11S. For this reason, it is possible to prevent the cable HN from being caught on an obstacle such as a branch while running, and thus it is possible to prevent the electrical connection of the mower motor 15 from being broken. In addition, it is possible to minimize the slack in the cable HN even when lifting the mower deck unit MU.

When maintaining the mower deck unit (working unit) MU, there is a need to remove the bolts of the support bracket 367, and the brackets 356L, and 356R from the link mechanism by loosening the bolts (or from the chassis 11 by removing the bolts of other parts of the link mechanism). However, at this time, since the coupler CP2 may be simply removed, the electrical connection is easer, and maintainability of the electric lawn mower 10 is improved.

Figure 33:
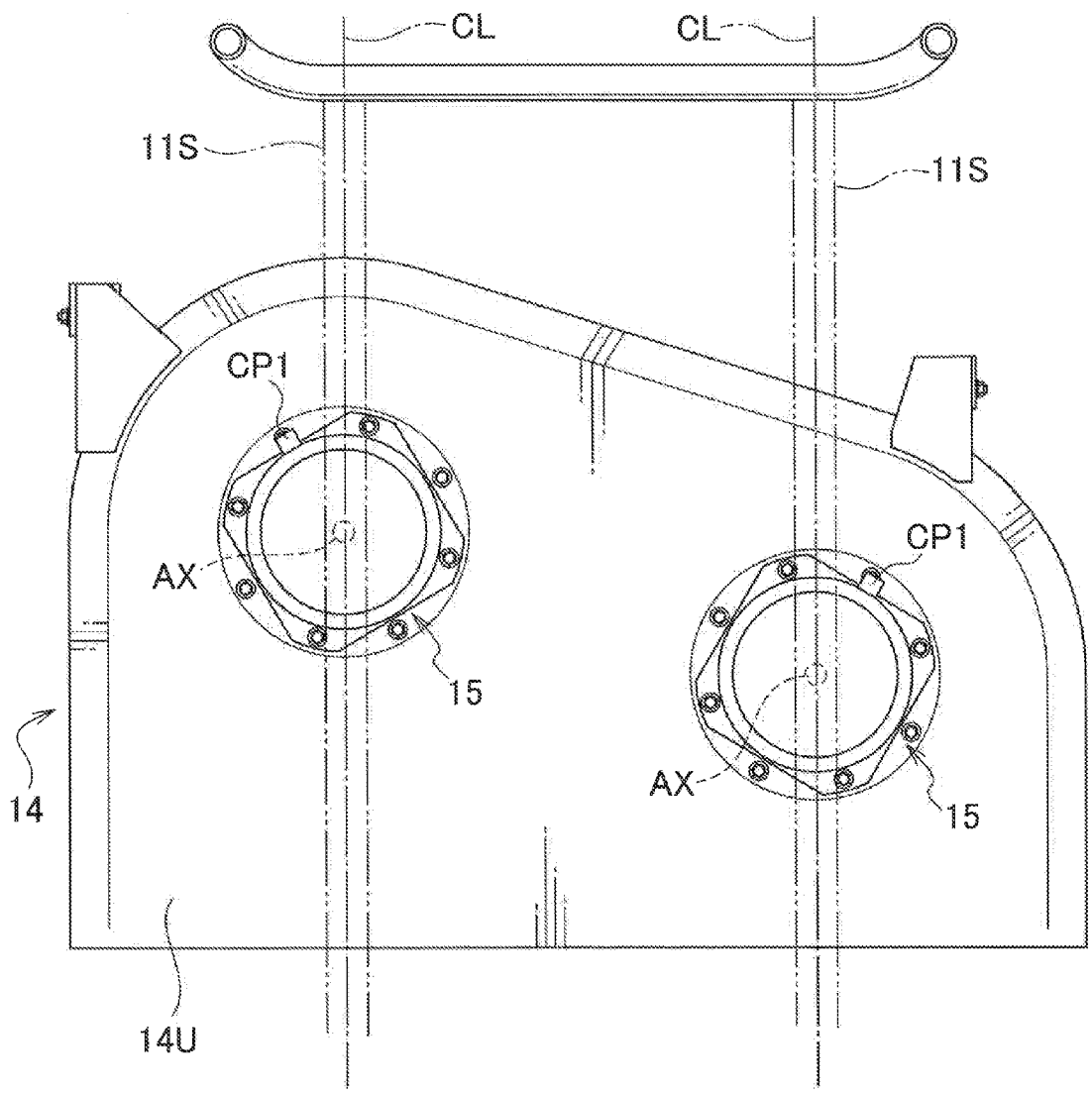
FIG. 33 is a diagram illustrating the arrangement of a coupler.

Note that as illustrated in FIG. 33, when the coupler CP1 is disposed outside the side portion 11S, the coupler CP2 is easily removed and is preferable. The position of the coupler CP1 may be located outside the side portion 11S, and is not intended to be limited to the position of FIG. 33.

Figure 34A:
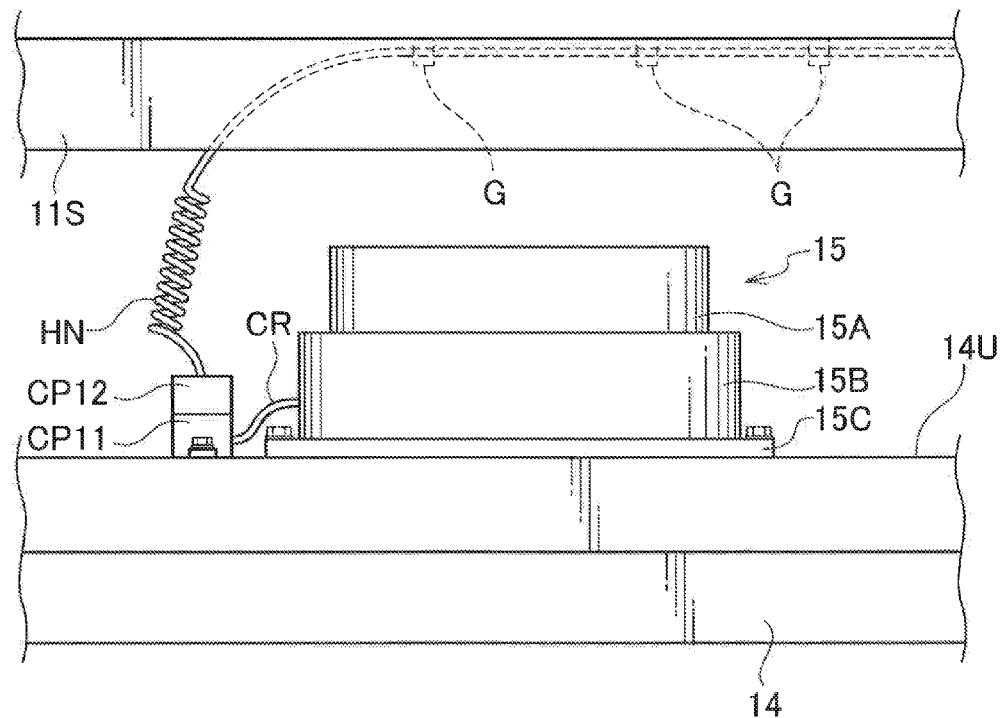
FIGS. 34A and 34B are diagrams illustrating modified examples of FIGS. 32A and 32B.
Figure 34B:
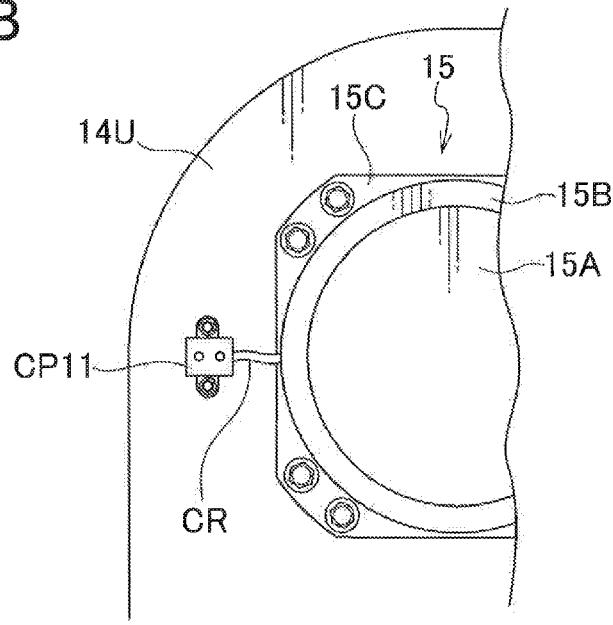

The arrangement of the couplers CP1, CP2 is not limited to the examples described above, and, for example, may be as illustrated in FIGS. 34A and 34B. In this example, a cord CR protrudes from the side surface of the lower portion 15B of the mower motor 15, and a female type coupler CP21 is included at the leading end thereof. The coupler CP21 is fixed to the upper surface 14U of the mower deck 14 by the bolt or the like. Therefore, the outlet portion faces upward. A male type coupler CP22 is connected to the coupler CP21. The coupler CP22 is connected to the leading end of the cable HN of the example described above. In the case of disposing the coupler CP21 in this manner, when attaching and detaching the coupler CP22, the side portion of the mower motor 15 is not pushed or pulled. For this reason, it is possible to avoid the risk of damage or breakdown, without adding unnecessary shock to the mower motor 15.

Figure 35A:
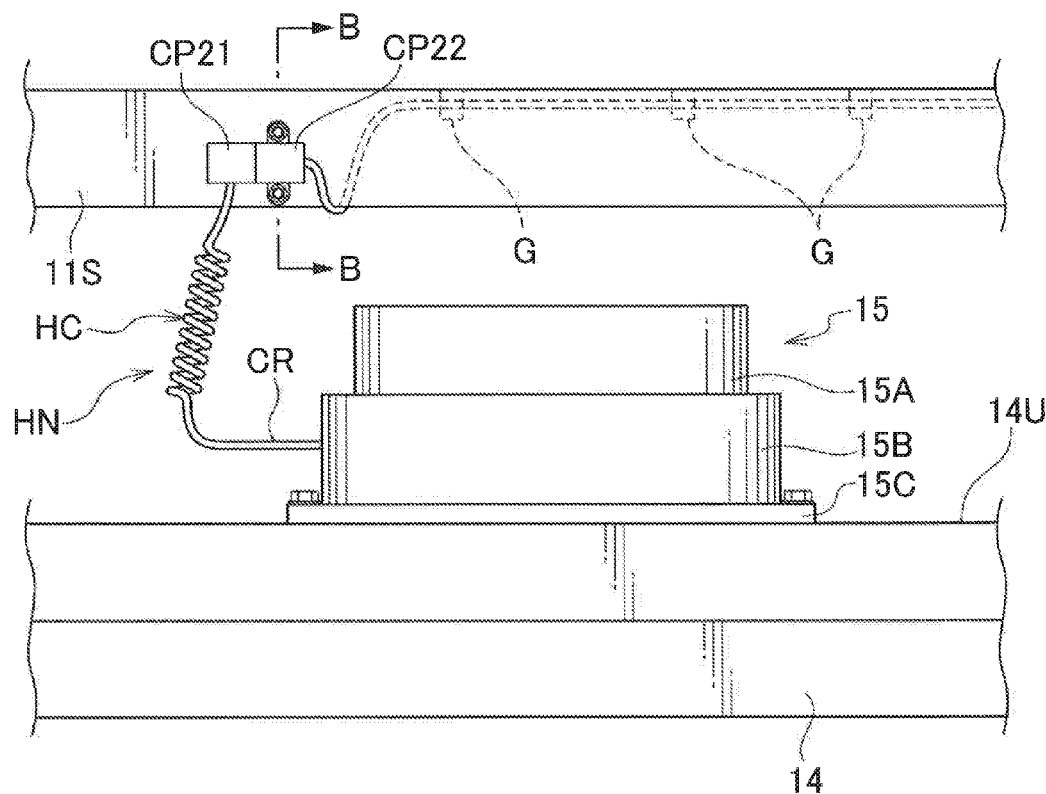
FIGS. 35A and 35B are diagrams illustrating modified examples of FIGS. 32A and 32B, and FIGS. 34A and 34B.
Figure 35B:
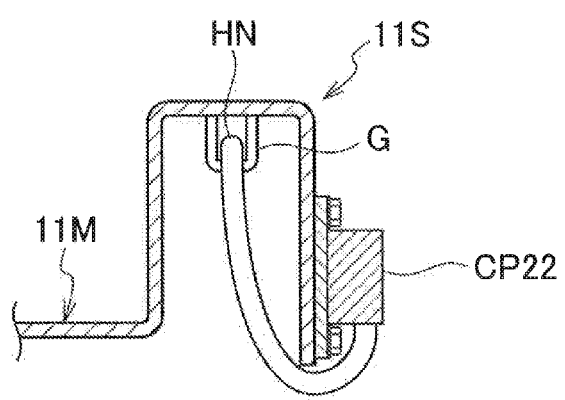

Furthermore, as illustrated in FIGS. 35A, and 35B, a coupler CP32 may be attached to the side portion 11S of the chassis 11 by a bolt or the like, and a coupler CP31 may be connected to the coupler CP32 in the side portion 11S. Other reference numerals are the same as those in FIGS. 32 and 34.

Note that the mower blades and the mower motors 15 provided in the mower deck 14 are not each limited to two, but may be three or more, respectively.

In addition, the electric work machine of the invention is not intended to be limited to the riding electric lawn mower of this example. Therefore, the electric work machine may not be a riding machine. Furthermore, the electric work machine may not be the mower blade, and for example, may be an electric work machine that is used for the cleaning work of a road surface by mounting a scrub brush in place of the mower blade.

The invention is not intended to be limited to the examples described above, and is able to take any form without departing from the spirit of the invention.

INDUSTRIAL APPLICABILITY

For example, the electric work machine of the invention may also be applied to an electric work machine that includes a bucket or the like as a working unit, without being limited to the electric lawn mower.

The invention claimed is:
1. An electric work machine comprising:
a working unit;
a working unit motor configured to drive the working unit;
running wheels;
a running motor configured to rotate the running wheels; and
a battery case equipped with a battery that supplies electric power to the working unit motor and the running motor,
wheels for facilitating movement being attached to the battery case, and the battery case being connected to a rear portion of a vehicle body frame of the electric work machine in a freely attachable and detachable manner,
wherein a body-side connecting portion for connecting the battery case is included in the rear portion of the vehicle body frame, and
a battery-side connecting portion to be connected to the body-side connecting portion is included in the battery case,
rotating units are included on both side surfaces of the battery case, respectively, a gripping portion is attached to the rotating unit, and the battery-side connecting portion is included at a position that is eccentric from a rotating point of the rotating unit, an abutting portion for keeping the battery case in the rear portion of the vehicle body frame is included, the battery-side connecting portion is rotatably connected to the body-side connecting portion, and by rotating the rotating unit by the gripping portion, the battery case is rotated using the body-side connecting portion as the rotating point and is kept on the vehicle body frame by coming into contact with the abutting portion.

2. The electric work machine according to claim 1, wherein the working unit is a mower blade, the working unit motor is a mower motor, and the mower blade is rotated by the mower motor to mow grass.

3. The electric work machine according to claim 1, further comprising:

a locking mechanism that locks the rotation of the rotating unit of the battery case.

4. The electric work machine according to claim 1, wherein the abutting portion includes a body-side fixing portion, and the battery case includes a battery-side fixing portion, and the battery case is fixed to the abutting portion by connecting the body-side fixing portion and the battery-side fixing portion to each other.

5. The electric work machine according to claim 1, wherein a buffer portion for reducing impact when bringing the battery case into contact with the abutting portion is included in the rear portion of the vehicle body frame.

6. The electric work machine according to claim 1, wherein an abut promoting portion for making it easier to keep the battery case in the abutting portion is included in the rear portion of the vehicle body frame.

7. The electric work machine according to claim 1, wherein the abutting portion is provided so as to be inclined in a forward direction, the wheels provided in the battery case include a pair of front wheels and a pair of rear wheels, a rear wheel bracket configured to rotatably support the rear wheels and a rear wheel support portion configured to turnably support the rear wheel bracket are attached to the battery case, and a rotation center of the rear wheels is provided so as to deviate with respect to a turning center line of the rear wheel bracket.

8. The electric work machine according to claim 1, wherein a cover is provided on an upper portion of the battery case, the cover is freely opened and closed with respect to the battery case, a charging port for charging the battery is included in the cover, and the charging port is exposed by opening the cover.

9. The electric work machine according to claim 7, wherein the running wheels are a pair of rear wheels, the pair of rear wheels is included on both outer sides of the rear portion of the vehicle body frame, the electric work machine is able to perform zero-turn, when the battery case is mounted, the rotation center of the rear wheels of the battery case is located in front of the turning center line of the rear wheel bracket, and the rear wheels of the battery case are arranged within a turning circle during the zero-turn.

10. The electric work machine according to claim 1, wherein the battery case includes an upper chamber and a lower chamber, the battery is housed in the lower chamber, and a control unit configured to control an output voltage and an output current of the battery is housed in the upper chamber.

11. The electric work machine according to claim 10, wherein the upper chamber is set to be able to rotate with respect to the lower chamber, and a bottom surface of the upper chamber also serves as an upper surface of the lower chamber, and the battery is set to be able to be taken out upward by opening the upper surface of the lower chamber.

12. The electric work machine according to claim 11, wherein the upper chamber is set to be freely rotated with respect to the lower chamber, and the battery case includes a locking mechanism for restricting the rotation.

13. The electric work machine according to claim 10, wherein a side surface of the lower chamber is set to be able to be opened, and the battery is housed or taken out of the openable side surface.

14. The electric work machine according to claim 10, further comprising:

an AC-DC converter for converting electric power of the battery into an alternating current, and an outlet for using the AC power converted by the AC-DC converter, wherein the outlet is provided on the surface of the battery case.

15. The electric work machine according to claim 10, further comprising:

a measurement unit configured to measure a voltage and a current of the battery, and a display unit for displaying the measured voltage value and current value, wherein the display unit is included on the surface of the battery case.

* * * * *